United States Patent
Han et al.

(10) Patent No.: US 12,445,935 B2
(45) Date of Patent: Oct. 14, 2025

(54) DATA TRANSMISSION METHOD AND APPARATUS

(71) Applicant: HUAWEI TECHNOLOGIES CO., LTD., Guangdong (CN)

(72) Inventors: Feng Han, Shanghai (CN); Yinghao Jin, Boulogne Billancourt (FR); Hongzhuo Zhang, Shanghai (CN); Xudong Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 342 days.

(21) Appl. No.: 17/482,813

(22) Filed: Sep. 23, 2021

(65) Prior Publication Data

US 2022/0015007 A1 Jan. 13, 2022

Related U.S. Application Data

(63) Continuation of application No. PCT/CN2020/081830, filed on Mar. 27, 2020.

(30) Foreign Application Priority Data

Mar. 29, 2019 (CN) .......................... 201910252629.8

(51) Int. Cl.
*H04W 40/24* (2009.01)
*H04W 76/27* (2018.01)

(52) U.S. Cl.
CPC ......... *H04W 40/248* (2013.01); *H04W 76/27* (2018.02)

(58) Field of Classification Search
CPC ........................... H04W 40/248; H04W 76/27
See application file for complete search history.

(56) References Cited

U.S. PATENT DOCUMENTS

| 10,834,772 B2 * | 11/2020 | Wang ..................... H04W 76/11 |
| 2018/0270892 A1 * | 9/2018 | Choi ..................... H04W 36/34 |

(Continued)

FOREIGN PATENT DOCUMENTS

| CN | 104363621 A | 2/2015 |
| CN | 107645779 A | 1/2018 |

(Continued)

OTHER PUBLICATIONS

3GPP TR 23.724 V16.0.0 (Dec. 2018), "3rd Generation Partnership Project; Technical Specification Group Services and System Aspects; Study on Cellular Internet of Things (IoT) support and evolution for the 5G System(Release 16)," Dec. 2018, 276 pages.
3GPP TS 38.331 V15.4.0 (Dec. 2018), "3rd Generation Partnership Project; Technical Specification Group Radio Access Network;NR; Radio Resource Control (RRC) protocol specification(Release 15)," Dec. 2018, 474 pages.
PCT International Search Report and Written Opinion issued in International Application No. PCT/CN2020/081830 on Jun. 17, 2020, 18 pages (with English translation).

(Continued)

*Primary Examiner* — Kashif Siddiqui
(74) *Attorney, Agent, or Firm* — Fish & Richardson P.C.

(57) ABSTRACT

Examples in this application disclose a communications system and apparatus. One example system includes a first access network device and a second access network device, and the first access network device sends, to the second access network device, indication information indicating a requirement of transmitting small data, receives, from the second access network device, a context of the terminal and an address of a tunnel used to transmit uplink data, indicates, based on the context, the terminal to enter a connected state, and sends uplink data of the terminal to the second access network device based on the address of the tunnel, then the second access network device sends the uplink data to a core network device.

15 Claims, 13 Drawing Sheets

(56) References Cited

U.S. PATENT DOCUMENTS

| | | | |
|---|---|---|---|
| 2018/0332561 A1 | 11/2018 | Da Silva et al. | |
| 2019/0320476 A1* | 10/2019 | Wang | H04W 76/15 |
| 2020/0053815 A1* | 2/2020 | Teyeb | H04W 76/11 |
| 2020/0205123 A1* | 6/2020 | Byun | H04W 76/27 |
| 2020/0229264 A1* | 7/2020 | Bangolae | H04W 76/27 |
| 2020/0367310 A1* | 11/2020 | Jung | H04W 76/15 |
| 2021/0168758 A1* | 6/2021 | Luo | H04W 76/15 |
| 2021/0274587 A1* | 9/2021 | Jung | H04W 76/15 |
| 2021/0392561 A1* | 12/2021 | Liang | H04L 45/02 |
| 2023/0164861 A1* | 5/2023 | Wang | H04W 76/15 370/328 |
| 2023/0164871 A1* | 5/2023 | Jung | H04W 12/0433 370/328 |
| 2023/0309173 A1* | 9/2023 | Kim | H04W 80/08 |

FOREIGN PATENT DOCUMENTS

| | | | | |
|---|---|---|---|---|
| CN | 107889274 A | 4/2018 | | |
| CN | 108366398 A | 8/2018 | | |
| CN | 108616943 A | 10/2018 | | |
| CN | 108616988 A | 10/2018 | | |
| CN | 109246772 A | 1/2019 | | |
| EP | 2683183 A1 * | 1/2014 | | H04W 36/0055 |
| EP | 3300288 A1 * | 3/2018 | | H04L 29/12 |
| WO | 2018142207 A1 | 8/2018 | | |
| WO | 2019041142 A1 | 3/2019 | | |

OTHER PUBLICATIONS

3GPP TS 38.300 V15.4.0, "3rd Generation Partnership Project; Technical Specification Group Radio Access Network; NR; NR and NG-RAN Overall Description; Stage 2 (Release 15)," Dec. 2018, 97 pages.

3GPP TS 38.413 V15.2.0, "3rd Generation Partnership Project; Technical Specification Group Radio Access Network; NG-RAN; NG Application Protocol (NGAP) (Release 15)," Dec. 2018, 308 pages.

3GPP TS 38.423 V15.2.0, "3rd Generation Partnership Project; Technical Specification Group Radio Access Network; NG-RAN; Xn application protocol (XnAP) (Release 15)," Dec. 2018, 281 pages.

3GPP TR 23.799 V14.0.0 (Dec. 2016), "3rd Generation Partnership Project; Technical Specification Group Services and System Aspects; Study on Architecture for Next Generation System(Release 14)," Dec. 2016, 522 pages.

Extended European Search Report issued in European Application No. 20782960.7 on Mar. 15, 2022, 10 pages.

Office Action issued in Chinese Application No. 201910252629.8 on May 12, 2022, 10 pages.

ZTE, "Introduction of handover enhancement in dual connectivity," 3GPP TSG-RAN WG3 Meeting #89, R3-151511, Beijing, P.R. China, Aug. 24-28, 2015, 17 pages.

* cited by examiner

DATA TRANSMISSION METHOD AND APPARATUS

CROSS-REFERENCE TO RELATED APPLICATIONS

This application is a continuation of International Patent Application No. PCT/CN2020/081830, filed on Mar. 27, 2020, which claims priority to Chinese Patent Application No. 201910252629.8, filed on Mar. 29, 2019. The disclosures of the aforementioned applications are hereby incorporated by reference in their entireties.

TECHNICAL FIELD

Embodiments of this application relate to the field of communications technologies, and in particular, to a data transmission method and apparatus.

BACKGROUND

In a mobile communications standard, a state of a terminal: a radio resource control (radio resource control, RRC) inactive (Inactive) state is specified. A context (context) of the terminal in the inactive state is stored on both the terminal and a base station that configures the terminal to enter the inactive state.

After the terminal in the inactive state moves from a coverage area of the base station that configures the terminal to enter the inactive state to a coverage area of a new base station, the base station that configures the terminal to enter the inactive state may be considered as a base station (Last serving gNB) that last serves the terminal, or an anchor base station (anchor gNB). The new base station is a base station that currently serves the terminal, and in this case, a core network side still considers that the anchor base station transmits uplink data to a core network device. If the terminal in the inactive state has to-be-transmitted uplink data on the new base station, the new base station notifies the core network device to perform path switching. After a path is switched, the new base station sends the uplink data to the core network device. However, a process of notifying the core network device to perform the path switching causes signaling overheads.

SUMMARY

Embodiments of this application provide a data transmission method and apparatus, to resolve a signaling overhead problem caused by a need to notify a core network device to perform path switching when a terminal moves to a new base station and small data is transmitted.

According to a first aspect, this application provides a data transmission method. A first access network device that currently serves a terminal may obtain an identifier of a second access network device that configures the terminal to enter an inactive state. The first access network device may send a retrieve terminal context request message to the second access network device based on the identifier of the second access network device, where the retrieve terminal context request message includes indication information used to indicate a requirement of transmitting small data. Certainly, the indication information used to indicate the requirement of transmitting the small data may alternatively be carried in another message and sent to the second access network device. The small data is data that is sent by the terminal and that is less than a preset quantity of bytes. After receiving the retrieve terminal context request message, the second access network device may provide the first access network device with a context of the terminal, and after receiving the indication information used to indicate the requirement of transmitting the small data, the second access network device may allocate, to the first access network device, a tunnel address used to transmit uplink data. In this case, the first access network device may receive the context of the terminal and the address of the tunnel used to transmit uplink data that are sent by the second access network device. The first access network device may indicate, based on the context of the terminal, the terminal to enter a connected state. The terminal that enters the connected state sends uplink data to the first access network device, and the first access network device receives the uplink data sent by the terminal. The first access network device may send the uplink data to the second access network device based on the address of the tunnel that is used to transmit the uplink data and that is sent by the second access network device. The second access network device sends the uplink data to a core network device.

In a process of transmitting the uplink data, the first access network device transmits the uplink data to the second access network device, and the second access network device transmits the uplink data to the core network device. The first access network device does not need to notify the core network device to perform path switching, thereby avoiding signaling overheads caused by the path switching.

In a possible implementation, the second access network device may further send, to the first access network device, indication information used to indicate to retain the context of the terminal, to indicate that the second access network device retains the context of the terminal. Optionally, the indication information used to indicate to retain the context of the terminal may be included in a retrieve terminal context response message sent by the second access network device to the first access network device, or in a separate message. Therefore, the first access network device does not send a terminal context release message to the second access network device, and the second access network device retains the context of the terminal.

In a possible implementation, the identifier of the second access network device is sent by the terminal to the first access network device. When the terminal in the inactive state has to-be-transmitted uplink data, the terminal may send a radio resource control resume request message to the first access network device that currently serves the terminal, to request to send the uplink data after the terminal resumes to be in the connected state. The radio resource control resume request message includes an inactive-radio network temporary identifier (inactive-radio network temporary identifier, I-RNTI) configured for the terminal by the second access network device that configures the terminal to enter the inactive state. The first access network device may learn of the identifier of the second access network device based on the I-RNTI.

In a possible implementation, the indication information used to indicate the requirement of transmitting the small data includes one or more of the following: information used to indicate transmission of the small data, information used to indicate that an anchor access network device remains unchanged, or information used to indicate that the context of the terminal is not transferred. One or more pieces of the information may be a cause value, or may be explicitly indicated information, or the like.

In this solution, in a small data transmission scenario, the terminal may communicate with the core network device through an anchor base station, so that a signaling procedure of path switching of the core network device can be avoided, thereby reducing the signaling overheads.

In a possible implementation, the indication information that is used to indicate the requirement of transmitting the small data and that is sent by the first access network device to the second access network device may be sent by the terminal to the first access network device, for example, the radio resource control resume request message sent by the terminal to the first access network device. If the radio resource control resume request message includes the indication information used to indicate the requirement of transmitting the small data, the first access network device receives the radio resource control resume request message sent by the terminal.

The terminal notifies, by using the radio resource control resume request message, the first access network device of the indication information used to indicate the requirement of transmitting the small data, to reduce the signaling overheads.

In a possible implementation, the context of the terminal and the address of the tunnel used to transmit uplink data may be carried in different messages, or may be carried in a same message. The second access network device may include both the context of the terminal and the address of the tunnel used to transmit uplink data in the retrieve terminal context response message. In this case, when the first access network device receives the context of the terminal and the address of the tunnel used to transmit uplink data that are sent by the second access network device, the first access network device may receive the retrieve terminal context response message sent by the second access network device, where the retrieve terminal context response message includes the context of the terminal and the address of the tunnel used to transmit uplink data.

Signaling exchange can be reduced by including both the context of the terminal and the address of the tunnel used to transmit uplink data in the context response.

In a possible implementation, the address of the tunnel used to transmit uplink data includes one or more of a protocol data unit (Protocol Data Unit, PDU) session identifier and uplink forwarding information, where the uplink forwarding information at least includes an uplink data forwarding address corresponding to a PDU session.

In a possible implementation, the uplink forwarding information may further include at least one data radio bearer (Data Radio Bearer, DRB) list and an uplink data forwarding address corresponding to each DRB list, or at least one logical channel identifier (Logical Channel Identity, LCID) list and an uplink data forwarding address corresponding to each LCID list.

In a possible implementation, the uplink forwarding information may further include: at least one quality of service QoS flow identifier list, and an uplink data forwarding address of the PDU session corresponding to each quality of service flow identifier list. The QoS flow identifier list includes one or more quality of service flow identifiers, and the LCID list includes one or more LCIDs.

In a possible implementation, the first access network device may further determine whether the terminal completes uplink data transmission. When determining that the terminal completes the uplink data transmission, the first access network device may send an uplink data transmission end indication message to the second access network device, where the uplink data transmission end indication message is used to indicate that the terminal completes the uplink data transmission. The uplink data transmission end indication message may be represented by using an end marker (end marker) packet transmitted by using the address of the tunnel used to transmit uplink data. The uplink data transmission end indication message may alternatively be an interface control message. For example, the uplink data transmission end indication message may be a message indicating that the PDU session ends uplink transmission or a message indicating that a data bearer ends uplink transmission.

In a possible implementation, the first access network device sends, to the second access network device, an address of a tunnel used to transmit downlink data. When receiving downlink data sent by the terminal, the second access network device may send the downlink data to the first access network device. Correspondingly, the first access network device receives the downlink data sent by the second access network device, and sends the downlink data to the terminal.

In a possible implementation, the second access network device may further determine whether the core network device completes downlink data transmission. When determining that the core network device completes the downlink data transmission, the second access network device may send a downlink data transmission end indication message to the first access network device, where the downlink data transmission end indication message is used to indicate that the core network device completes the downlink data transmission. The downlink data transmission end indication message may be represented by using an end marker (end marker) packet transmitted by using an address of a tunnel used to transmit downlink data. The downlink data transmission end indication message may alternatively be an interface control message. For example, the downlink data transmission end indication message may be a message indicating that the PDU session ends downlink transmission or a message indicating that the data bearer ends downlink transmission. The downlink data transmission end indication message may be sent by the core network device to the second access network device.

According to a second aspect, a data transmission method is provided. A terminal in an inactive state may send early uplink data to a first access network device that currently serves the terminal, and the first access network device receives the early uplink data sent by the terminal. The first access network device may send the early uplink data to a second access network device that configures the terminal to enter the inactive state, and the second access network device sends the early uplink data to a core network device.

In a process of transmitting uplink data, the first access network device transmits the uplink data to the second access network device, and the second access network device transmits the uplink data to the core network device. In this way, the first access network device does not need to notify the core network device to perform path switching, thereby avoiding signaling overheads caused by the path switching.

In a possible implementation, when the terminal in the inactive state has to-be-transmitted uplink data, the terminal may send a radio resource control resume request message to the first access network device. The radio resource control resume request message includes an inactive-radio network temporary identifier I-RNTI configured for the terminal by the second access network device that configures the terminal to enter the inactive state, and the early uplink data. The first access network device receives the radio resource control resume request message sent by the terminal, and may learn of an identifier of the second access network device based on the I-RNTI in the radio resource control resume request message. Then, the first access network device sends the early uplink data to the second access network device based on the identifier of the second access network device.

The terminal includes the early uplink data in the radio resource control resume request message, thereby reducing signaling overheads between the terminal and the first access network device.

In a possible implementation, when the first access network device sends the early uplink data to the second access network device, the early uplink data may be sent by using interface signaling. Specifically, after receiving the radio resource control resume request message sent by the second access network device, the first access network device may send a retrieve terminal context request message to the second access network device, to request to retrieve a context of the terminal. The retrieve terminal context request message may include the early uplink data.

The first access network device includes the early uplink data in the retrieve terminal context request message, thereby better reducing signaling overheads between the first access network device and the second access network device.

In a possible implementation, when the first access network device sends the early uplink data to the second access network device, the early uplink data may be sent through an uplink tunnel. Specifically, after receiving the radio resource control resume request message sent by the terminal, the first access network device may send, to the second access network device, indication message used to indicate to establish the uplink tunnel. After receiving the indication message that is sent by the first access network device and that is used to indicate to establish the uplink tunnel, the second access network device may send, to the first access network device, an address of a tunnel used to transmit uplink data. In this case, after the first access network device receives the address of the tunnel that is used to transmit the uplink data and that is sent by the second access network device, the first access network device determines, based on the address of the tunnel, a tunnel used to transmit the uplink data, and sends the early uplink data to the second access network device through the determined tunnel.

For example, the first access network device may also establish the uplink tunnel to the second access network device, and the first access network device sends the early uplink data to the second access network device through uplink tunnel.

In a possible implementation, after receiving the radio resource control resume request message sent by the terminal, the first access network device may send the retrieve terminal context request message to the second access network device, to request to retrieve the context of the terminal. The retrieve terminal context request message includes the indication message used to indicate to establish the uplink tunnel.

The indication information used to indicate to establish the uplink tunnel is carried in the retrieve terminal context request message, thereby better reducing the signaling overheads between the first access network device and the second access network device.

In a possible implementation, after receiving the retrieve terminal context request message sent by the first access network device, the second access network device may further send a retrieve terminal context failure message to the first access network device. The second access network device may include the address of the tunnel used to transmit uplink data in the retrieve terminal context failure message. In this case, after receiving the retrieve terminal context failure message sent by the second access network device, the first access network device may learn of the address of the tunnel used to transmit uplink data, and include the address of the tunnel in the retrieve terminal context failure message, thereby reducing the signaling overheads between the first access network device and the second access network device.

In a possible implementation, the indication information used to indicate to establish the uplink tunnel may include one or more of an LCID list, a DRB ID list, and a PDU session list.

The address of the tunnel used to transmit uplink data includes one or more of the following:

a PDU session identifier and uplink forwarding information. The uplink forwarding information at least includes an uplink data forwarding address corresponding to a PDU session, and the uplink forwarding information may further include: at least one data radio bearer (Data Radio Bearer, DRB) list and an uplink data forwarding address corresponding to each DRB list, or at least one logical channel identifier (Logical Channel Identity, LCID) list and an uplink data forwarding address corresponding to each LCID list.

In a possible implementation, the uplink forwarding information may further include: at least one quality of service QoS flow identifier list, and an uplink data forwarding address of the PDU session corresponding to each quality of service flow identifier list. The QoS flow identifier list includes one or more quality of service flow identifiers.

In a possible implementation, the first access network device may determine whether the terminal completes early uplink data transmission. When determining that the terminal completes the early uplink data transmission, the first access network device may send an uplink data transmission end indication message to the second access network device, where the uplink data transmission end indication message is used to indicate that the terminal completes the early uplink data transmission. The uplink data transmission end indication message may be represented by using an end marker (end marker) packet transmitted by using the address of the tunnel used to transmit uplink data. The uplink data transmission end indication message may alternatively be an interface control message, for example, may be a message indicating that the PDU session ends uplink transmission or a message indicating that the data bearer ends uplink transmission.

In a possible implementation, the second access network device may determine whether the core network device completes downlink data transmission. When determining that the core network device completes the downlink data transmission, the second access network device may send a downlink data transmission end indication message to the first access network device, where the downlink data transmission end indication message is used to indicate that the core network device completes the downlink data transmission. The downlink data transmission end indication message may be represented by using an end marker (end marker) packet transmitted by using an address of a tunnel used to transmit downlink data. The downlink data transmission end indication message may alternatively be an interface control message. For example, the downlink data transmission end indication message may be a message indicating that the PDU session ends downlink transmission or a message indicating that the data bearer ends downlink transmission. The downlink data transmission end indication message may be sent by the core network device to the second access network device.

According to a third aspect, a data transmission method is provided. A first access network device that currently serves a terminal may obtain an identifier of a second access network device that configures the terminal to enter an inactive state. The first access network device may send a retrieve terminal context request message to the second access network device based on the identifier of the second access network device, where the retrieve terminal context request message includes indication information used to indicate to establish dual connectivity for the terminal, and the indication information indicates that the first access network device is a secondary device, and the second access network device is a primary device when the dual connectivity is established. Certainly, the indication information used to indicate to establish the dual connectivity for the terminal may alternatively be carried in another message and sent to the second access network device. After receiving the retrieve terminal context request message, the second access network device may provide the first access network device with a context of the terminal, and after receiving the indication information used to indicate to establish the dual connectivity for the terminal, the second access network device establishes the dual connectivity for the terminal. The first access network device may receive the context of the terminal and information about completion of dual connectivity establishment that are sent by the second access network device. The first access network device may indicate, based on the context of the terminal, the terminal to enter a connected state. The terminal that enters the connected state sends uplink data to the first access network device. The first access network device receives the uplink data sent by the terminal, and sends the uplink data to the second access network device. The second access network device sends the uplink data to a core network device.

In a process of transmitting the uplink data, the first access network device transmits the uplink data to the second access network device, and the second access network device transmits the uplink data to the core network device. The first access network device does not need to notify the core network device to perform path switching, thereby avoiding signaling overheads caused by the path switching.

In a possible implementation, the identifier of the second access network device is sent by the terminal to the first access network device. When the terminal in the inactive state has to-be-transmitted uplink data, the terminal may send a radio resource control resume request message to the first access network device that currently serves the terminal, to request to send the uplink data after the terminal resumes to be in the connected state. The radio resource control resume request message includes an inactive-radio network temporary identifier (inactive-radio network temporary identifier, I-RNTI) configured for the terminal by the second access network device that configures the terminal to enter the inactive state. The first access network device may learn of the identifier of the second access network device based on the I-RNTI.

In a possible implementation, the information about the completion of the dual connectivity establishment sent by the second access network device to the first access network device may be an address of the tunnel used to transmit uplink data. In this case, when establishing the dual connectivity for the terminal, the second access network device may allocate, to the first access network device, the address of the tunnel used to transmit uplink data. In this case, the first access network device may receive the address of the tunnel that is used to transmit the uplink data and that is sent by the second access network device. After the first access network device receives the uplink data sent by the terminal, the first access network device may send the uplink data to the second access network device based on the address of the tunnel that is used to transmit the uplink data and that is sent by the second access network device. The second access network device sends the uplink data to the core network device.

In a possible implementation, the indication information used to indicate to establish the dual connectivity for the terminal includes one or more of the following: information used to indicate that small data is transmitted, information used to indicate that an anchor access network device remains unchanged, information used to indicate to establish the dual connectivity, or information used to indicate that the context of the terminal is not transferred. One or more pieces of the information may be a cause value, or may be explicitly indicated information, or the like.

In a possible implementation, the indication information that is used to indicate to establish the dual connectivity for the terminal and that is sent by the first access network device to the second access network device is notified by the terminal to the first access network device. The terminal may send the radio resource control resume request message to the first access network device. In this case, the first access network device receives the radio resource control resume request message sent by the terminal, and the radio resource control resume request message includes the indication information used to indicate to establish the dual connectivity for the terminal.

In a possible implementation, when the second access network device sends the context of the terminal to the first access network device, the second access network device may send a retrieve terminal context failure message and a service node (service node, SN) addition (SN addition) request message to the first access network device. In this case, the first access network device receives the retrieve terminal context failure message and the service node addition request message that are sent by the second access network device. The service node addition request message includes the context of the terminal. The service node addition request message may further include the address of the tunnel used to transmit uplink data. Certainly, the address of the tunnel used to transmit uplink data may be a separate message, or may be carried in another message. The retrieve terminal context failure message includes one or more of the following: information used to indicate transmission of the small data, information used to indicate that the anchor access network device remains unchanged, information used to indicate to establish the dual connectivity, or information used to indicate that the context of the terminal is not transferred.

In a possible implementation, when the second access network device sends the context of the terminal to the first access network device, the second access network device may send a retrieve terminal context response message to the first access network device. In this case, the first access network device receives the retrieve terminal context response message sent by the second access network device. The retrieve terminal context response message includes indication information used to indicate a requirement of transmitting small data. For example, the indication information used to indicate the requirement of transmitting the small data may be the information used to indicate transmission of the small data, the information used to indicate that the anchor access network device remains unchanged, or the information used to indicate that the context of the terminal is not transferred. The retrieve terminal context response message further includes the context of the terminal, and the retrieve terminal context response message may further include the address of the tunnel used to transmit uplink data. Certainly, the address of the tunnel used to transmit uplink data may be a separate message, or may be carried in another message.

In a possible implementation, the first access network device may determine whether the terminal completes early uplink data transmission. When determining that the terminal completes the early uplink data transmission, the first access network device may send an uplink data transmission end indication message to the second access network device, where the uplink data transmission end indication message is used to indicate that the terminal completes the early uplink data transmission. The uplink data transmission end indication message may be represented by using an end marker (end marker) packet transmitted by using the address of the tunnel used to transmit uplink data. The uplink data transmission end indication message may alternatively be an interface control message, for example, may be a message indicating that a PDU session ends uplink transmission or a message indicating that the data bearer ends uplink transmission.

In a possible implementation, the second access network device may determine whether the core network device completes downlink data transmission. When determining that the core network device completes the downlink data transmission, the second access network device may send a downlink data transmission end indication message to the first access network device, where the downlink data transmission end indication message is used to indicate that the core network device completes the downlink data transmission. The downlink data transmission end indication message may be represented by using an end marker (end marker) packet transmitted by using an address of a tunnel used to transmit downlink data. The downlink data transmission end indication message may alternatively be an interface control message. For example, the downlink data transmission end indication message may be a message indicating that the PDU session ends downlink transmission or a message indicating that the data bearer ends downlink transmission. The downlink data transmission end indication message may be sent by the core network device to the second access network device.

According to a fourth aspect, a data transmission system is provided. The system includes: a terminal, a first access network device, and a second access network device that perform the method according to any one of the foregoing aspects and the possible implementations of the foregoing aspects. The first access network device is an access network device that currently serves the terminal, and the second access network device is an access network device that configures the terminal to enter an inactive state.

In a possible implementation, the first access network device may be configured to send a retrieve terminal context request message to the second access network device, where the retrieve terminal context request message includes indication information used to indicate a requirement of transmitting small data.

In a possible implementation, the second access network device may be configured to send, to the first access network device, a context of the terminal and a tunnel address used to transmit uplink data. The first access network device may be further configured to: receive the context of the terminal and the address of the tunnel used to transmit uplink data that are sent by the second access network device; indicate, based on the context of the terminal, the terminal to enter a connected state; receive uplink data sent by the terminal; and send the uplink data to the second access network device based on the address of the tunnel. The second access network device may be further configured to send the uplink data to a core network device.

In a possible implementation, the indication information used to indicate the requirement of transmitting the small data may include one or more of the following: information used to indicate transmission of the small data, information used to indicate that an anchor access network device remains unchanged, or information used to indicate that the context of the terminal is not transferred.

In a possible implementation, the terminal may be further configured to send a radio resource control resume request message to the first access network device, and the request message includes the indication information used to indicate the requirement of transmitting the small data.

In a possible implementation, when the second access network device is configured to send, to the first access network device, the context of the terminal and the address of the tunnel used to transmit uplink data, the second access network device may send a retrieve terminal context response message to the first access network device. If the retrieve terminal context response message includes the context of the terminal and the address of the tunnel used to transmit uplink data, the first access network device may receive, by using the retrieve terminal context response message, the context of the terminal and the address of the tunnel used to transmit uplink data.

In a possible implementation, the address of the tunnel used to transmit uplink data may include: a protocol data unit PDU session identifier and/or uplink forwarding information. The uplink forwarding information at least includes an uplink data forwarding address corresponding to a PDU session, and the uplink forwarding information may further include: at least one data radio bearer (Data Radio Bearer, DRB) list and an uplink data forwarding address corresponding to each DRB list, or at least one logical channel identifier (Logical Channel Identity, LCID) list and an uplink data forwarding address corresponding to each LCID list.

In a possible implementation, the uplink forwarding information may further include: at least one quality of service QoS flow identifier list, and an uplink data forwarding address of the PDU session corresponding to each quality of service flow identifier list.

In a possible implementation, the first access network device may be further configured to send an uplink data transmission end indication message to the second access network device, where the uplink data transmission end indication message is used to indicate that the terminal completes uplink data transmission.

In a possible implementation, the second access network device may be further configured to send a downlink data transmission end indication message to the first access network device, where the downlink data transmission end indication message is used to indicate that the core network device completes downlink data transmission.

According to a fifth aspect, a data transmission apparatus is provided. The apparatus has a functional module for implementing the method according to any one of the foregoing aspects and the possible implementations of the foregoing aspects. The functional module may be implemented by hardware, or may be implemented by hardware executing corresponding software. The hardware or the software includes one or more modules corresponding to the foregoing function.

In a possible implementation, the apparatus may be a chip or an integrated circuit.

In a possible implementation, the apparatus includes a transceiver and a processor, and the apparatus may perform, through the processor, the method according to any one of the first aspect to the fourth aspect and the possible implementations of the first aspect to the fourth aspect.

The transceiver may be an interface circuit.

In a possible implementation, the apparatus may further include a memory, and the memory is configured to store a computer program.

According to a sixth aspect, a computer-readable storage medium is provided. The computer storage medium stores computer-readable instructions, and when the computer-readable instructions are run, an apparatus is enabled to perform the method according to any one of the foregoing aspects and the possible implementations of the foregoing aspects.

According to a seventh aspect, a computer program product is provided. When the computer program product runs, an apparatus is enabled to perform the method according to any one of the foregoing aspects and the possible implementations of the foregoing aspects.

According to an eighth aspect, a chip is provided. The chip is coupled to a memory, and the chip is configured to read and execute a software program stored in the memory, to implement the method according to any one of the foregoing aspects and the possible implementations of the foregoing aspects.

DESCRIPTION OF EMBODIMENTS

The following describes in detail the embodiments of this application with reference to the accompanying drawings.

The embodiments of this application provide a data transmission method and apparatus, to resolve a signaling overhead problem in a conventional technology caused by a need to notify a core network device to perform path switching when a terminal moves to a new base station and small data is transmitted. The method, the apparatus, and a system are based on a same technical concept. Because problem-resolving principles of the method, the apparatus, and the system are similar, mutual reference may be made among implementations of the method, the apparatus, and the system. Repeated parts are not described again.

The technical solutions in the embodiments of this application may be applied to various communication systems, for example, a long term evolution (long term evolution, LTE) system, a worldwide interoperability for microwave access (worldwide interoperability for microwave access, WiMAX) communication system, a 5th generation (5th Generation, 5G) system such as a new radio access technology (new radio access technology, NR) system, and a future communication system.

Figure 1:
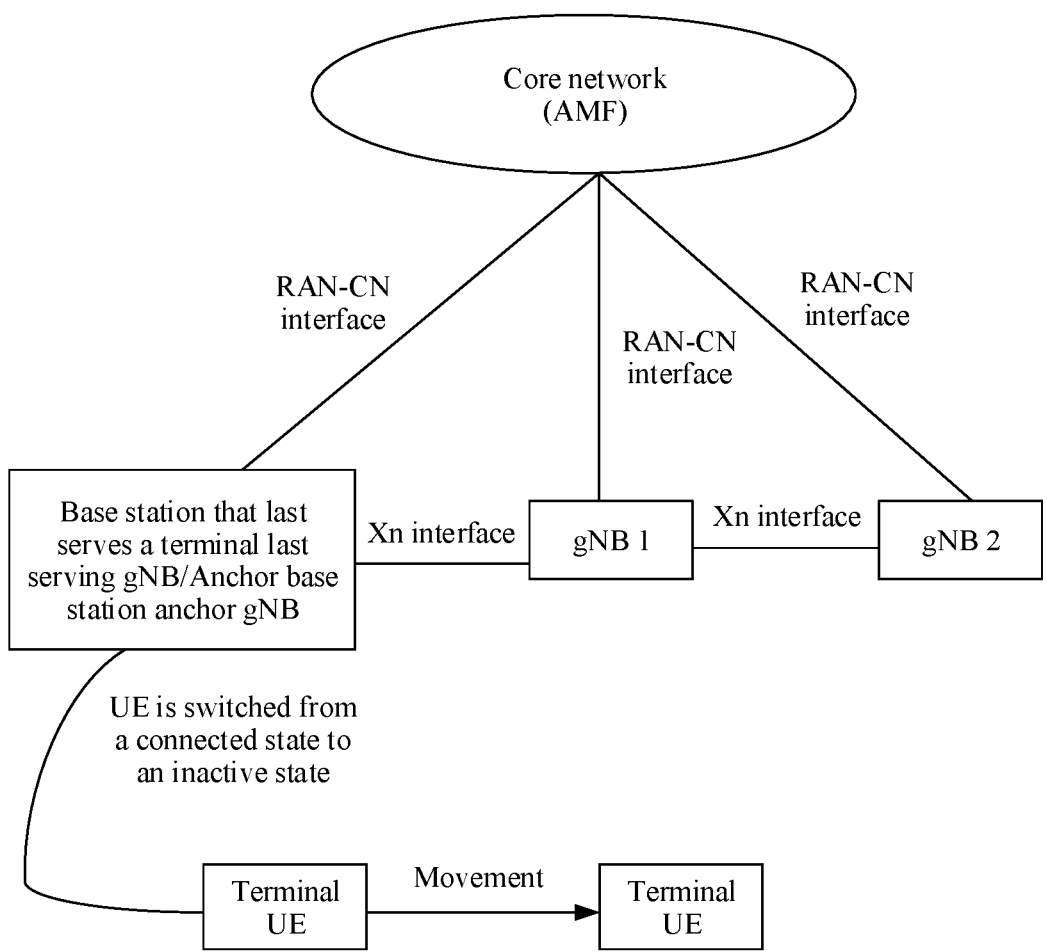
FIG. 1 is a schematic diagram of a wireless communication system according to an embodiment of this application.

For ease of understanding the embodiments of this application, an application scenario of this application is described below. As shown in FIG. 1, a terminal may move, and the terminal moves from a coverage area of a base station to a coverage area of another new base station during the movement. A base station that serves the terminal before the terminal moves is a base station (last serving gNB) that last serves the terminal, and may also be referred to as an anchor base station (anchor gNB). The anchor base station stores a context of the terminal, and may configure the terminal to enter an inactive state.

In an existing mechanism, after the terminal in the inactive state moves to the coverage area of the new base station, if there is uplink data needs to be transmitted, the new base station first configures the terminal to switch from the inactive state to a connected state, then, sends a path update request to an access and mobility management function (access and mobility management function, AMF) network element on a core (Core) network side, to request to perform path update. The terminal in the connected state sends the uplink data to the new base station, and the new base station sends the uplink data to the core network. For a specific process, refer to the following descriptions of FIG. 2. Base stations may communicate with each other through an Xn interface (interface), and a base station may communicate with a core network device through a RAN-CN interface (interface).

A service scenario described in the embodiments of this application is intended to describe the technical solutions in the embodiments of this application more clearly, and does not constitute a limitation on the technical solutions provided in the embodiments of this application. A person of ordinary skill in the art may know that, as a new service scenario emerges, the technical solutions provided in the embodiments of this application are also applicable to a similar technical problem.

In addition, the word "example" in the embodiments of this application is used to represent giving an example, an illustration, or a description. Any embodiment or implementation described as an "example" in this application should not be explained as being more preferred or having more advantages than another embodiment or implementation. Exactly, the word "example" is used to present a concept in a specific manner.

For ease of understanding the embodiments of this application, the following describes some terms in the embodiments of this application, to facilitate understanding of a person skilled in the art.

(1) An access network device is a device that can provide a terminal with a random access function, or a chip that may be disposed on the device. The device includes but is not limited to: an evolved NodeB (evolved NodeB, eNB), a base transceiver station (base transceiver station, BTS), a home base station (for example, a home evolved NodeB or a home NodeB, HNB), a baseband unit (baseband unit, BBU), an access point (access point, AP) in a wireless fidelity (wireless fidelity, WIFI) system, a wireless relay node, a wireless backhaul node, a transmission point (transmission and reception point, TRP or transmission point, TP), and the like. Alternatively, the device may be a gNB or a transmission point (TRP or TP) in a 5G system such as an NR system, an antenna panel or a group of antenna panels (including a plurality of antenna panels) of a base station in a 5G system, or may alternatively be a network node, such as a baseband unit (BBU) or a distributed unit (DU, distributed unit), that constitutes a gNB or a transmission point.

(2) The terminal is also be referred to as user equipment (user equipment, UE), a mobile station (mobile station, MS), a mobile terminal (mobile terminal, MT), or the like, and is a device that provides a user with voice and/or data connectivity. For example, the terminal includes a handheld device, a vehicle-mounted device, or the like that has a wireless connection function. Currently, the terminal may be: a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self-driving (self-driving), a wireless terminal in a remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

(3) Small data is data of less than a preset quantity of bytes. For example, data of several bytes or dozens of bytes may be referred to as the small data.

(4) An access and mobility management function (access and mobility management function, AMF) network element working as a control plane function in a core network, provides mobility management and access management functions.

The term "and/or" in this application describes an association relationship between associated objects and indicates that three relationships may exist. For example, A and/or B may indicate the following three cases: Only A exists, both A and B exist, and only B exists. The character "/" usually indicates an "or" relationship between the associated objects.

"A plurality of" in this application means two or more.

In the descriptions of this application, terms such as "first" and "second" are merely used for distinction and description, and should not be understood as an indication or implication of relative importance, or as an indication or implication of an order.

For ease of description, a first access network device is used to represent a base station (gNB 1) that currently serves the terminal in FIG. 1, and a second access network device is used to represent the base station (Last Serving gNB) that last serves the terminal in FIG. 1, that is, the anchor base station. An example in which a core network device is used to represent the AMF in FIG. 1 is used for description.

Step 201: A terminal in an inactive state sends a radio resource control resume request (RRC resume request) message to a first access network device.

The radio resource control resume request message includes an inactive-radio network temporary identifier I-RNTI configured by the second access network device for the terminal. The first access network device receives the radio resource control resume request message sent by the terminal in the inactive state, and learns of an identifier of the second access network device based on the I-RNTI included in the radio resource control resume request message.

The second access network device is an access network device that configures the terminal to enter the inactive state, and the second access network device may include the I-RNTI of the terminal in information about configuring the terminal to enter the inactive state.

Step 202: The first access network device sends a retrieve terminal context request (retrieve UE context request) message to the second access network device.

The first access network device requests a context of the terminal from the second access network device based on the learned identifier of the second access network device.

For example, the first access network device may send the retrieve terminal context request (retrieve UE context request) message to the second access network device. It may be understood that the first access network device may alternatively request the context of the terminal by using another message. This is not limited in this embodiment of this application.

Step 203: The second access network device sends a retrieve terminal context response (retrieve UE context response) message to the first access network device.

The second access network device provides the first access network device with the context of the terminal. For example, the second access network device may send the retrieve terminal context response (retrieve UE context response) message to the first access network device, where the response message includes the context of the terminal in the inactive state. In this case, the first access network device receives the context of the terminal sent by the second access network device.

Step 204: The first access network device sends a radio resource control resume (RRC resume) message to the terminal.

The first access network device indicates, based on the context of the terminal, the terminal in the inactive state to enter a connected state.

For example, the first access network device may send the radio resource control resume (RRC resume) message to the terminal. In this case, the terminal enters the connected state from the inactive state based on the received radio resource control resume message.

Step 205: After entering the connected state, the terminal may send a radio resource control resume complete (RRC resume complete) message to the first access network device.

Step 206: The first access network device sends a data forwarding address indication (data forwarding address indication) message to the second access network device, where the data forwarding address indication message includes an address of a tunnel used to transmit downlink data.

The first access network device provides the second access network device with the address of the tunnel used to transmit downlink data. Optionally, after determining that the terminal enters the connected state, the first access network device may send the data forwarding address indication (data forwarding address indication) message to the second access network device, where the data forwarding address indication message includes the address of the tunnel used to transmit downlink data. Therefore, after receiving downlink data sent by the core network device, the second access network device sends the downlink data to the first access network device by using the address of the tunnel.

Step 207: The first access network device sends a path switch request (path switch request) to the core network device.

After determining that the terminal enters the connected state, the first access network device sends the path switch request to the core network device, where the path switch request includes an identifier of the first access network device, thereby notifying the core network device to receive uplink data of the terminal from the first access network device.

Because the terminal previously accesses the second access network device, a data transmission path stored by the core network device for the terminal is that the second access network device transmits data to the core network device. When the terminal accesses the first access network device, the terminal notifies the core network device to switch the data transmission path, where a switched path is that the first access network device transmits the data to the core network device.

Step 208: The core network device sends a path switch request response (path switch request response) message to the first access network device, to notify the first access network device that the core network device has updated and stored the switched path.

Step 209: After receiving the path switch request response message sent by the core network device, the first access network device may send a terminal context release (UE context release) message to the second access network device, and the second access network device releases the context of the terminal.

The terminal subsequently sends the uplink data to the first access network device, and the first access network device sends the uplink data to the core network device. Based on the foregoing described data transmission process, it may be learned that when the terminal in the inactive state has new data to be sent, the first access network device switches the terminal from the inactive state to the connected state, after retrieving the context of the terminal from the second access network device. In addition, the first access network device notifies the core network device that a data forwarding path needs to be switched and updated. The uplink data of the terminal that is originally transmitted from the second access network device to the core network device is switched to be transmitted from the first access network device to the core network device. Signaling overheads are caused by notifying the core network device to perform path switching. Because the small data is sent periodically or non-intermittently when the terminal in the inactive state, the path switch request needs to be frequently sent to the core network device, so that the signaling overheads are relatively large.

Based on this, this application provides a data transmission method. The first access network device may send, to the second access network device, indication information used to indicate a requirement of transmitting small data. After the first access network device receives the uplink data sent by the terminal, the first access network device may send the uplink data to the second access network device, and the second access network device sends the uplink data to the core network device. In the data transmission process, the core network device does not need to be notified to perform path update, thereby avoiding the signaling overheads.

The indication information that is used to indicate the requirement of transmitting the small data and that is sent by the first access network device to the second access network device may be generated by the first access network device based on deployment of the first access network device. For example, when the first access network device supports only an industrial network, the first access network device generates the indication information used to indicate the requirement of transmitting the small data, or when a delay-sensitive terminal accesses the first access network device, the first access network device generates the indication information used to indicate the requirement of transmitting the small data. In addition, the indication information used to indicate the requirement of transmitting the small data may alternatively be sent to the first access network device based on a requirement of the terminal. For example, the first access network device learns, based on the indication information that is used to indicate the requirement of transmitting the small data that is sent by the terminal, that the terminal has the requirement of transmitting the small data, and sends, to the second access network device, the indication information used to indicate the requirement of transmitting the small data. In addition, the indication information used to indicate the requirement of transmitting the small data may also be indicated based on a cause value carried in the radio resource control resume message sent by the terminal.

Figure 2:
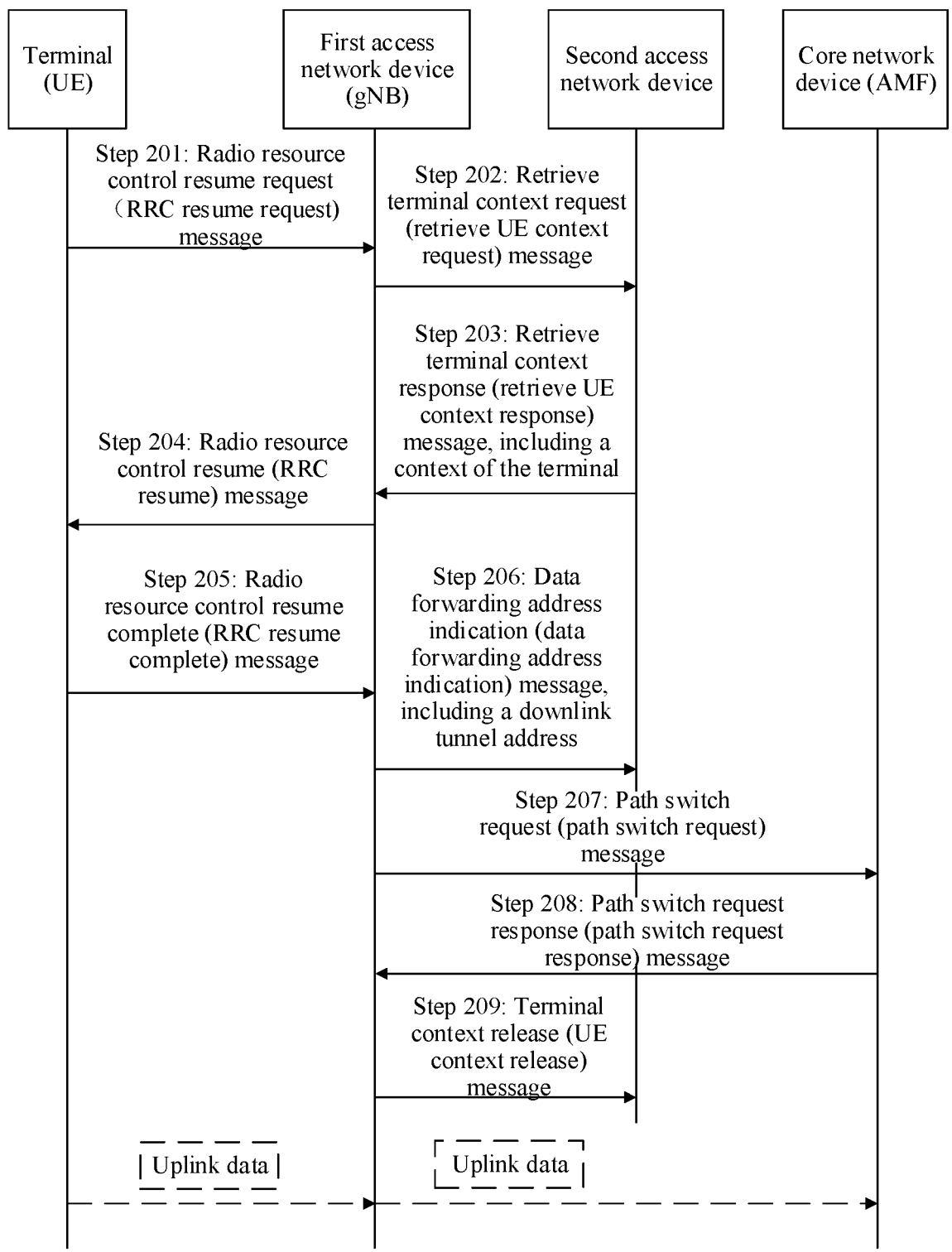
FIG. 2 is a schematic diagram of a data transmission process according to an embodiment of this application.

If the terminal sends, to the first access network device, the indication information used to indicate the requirement of transmitting the small data, the indication information used to indicate the requirement of transmitting the small data may be carried in the radio resource control resume request message in step 201 in FIG. 2, or certainly may be carried in another message. The indication information used to indicate the requirement of transmitting the small data may be indicated by using the cause value, or the indication information used to indicate the requirement of transmitting the small data may be carried by using a message in another format. A manner in which the terminal sends the indication information used to indicate the requirement of transmitting the small data is not limited in this embodiment of this application.

When the first access network device sends, to the second access network device, the indication information used to indicate the requirement of transmitting the small data, the indication information used to indicate the requirement of transmitting the small data may be carried in the retrieve terminal context request message in step 202 in FIG. 2, or certainly may be carried in another message, or the indication information used to indicate the requirement of transmitting the small data may be carried by using a message in another format, or the like.

When the first access network device sends the uplink data to the second access network device, the uplink data may be sent by using the address of the tunnel, or may be sent by using interface signaling.

Figure 3:
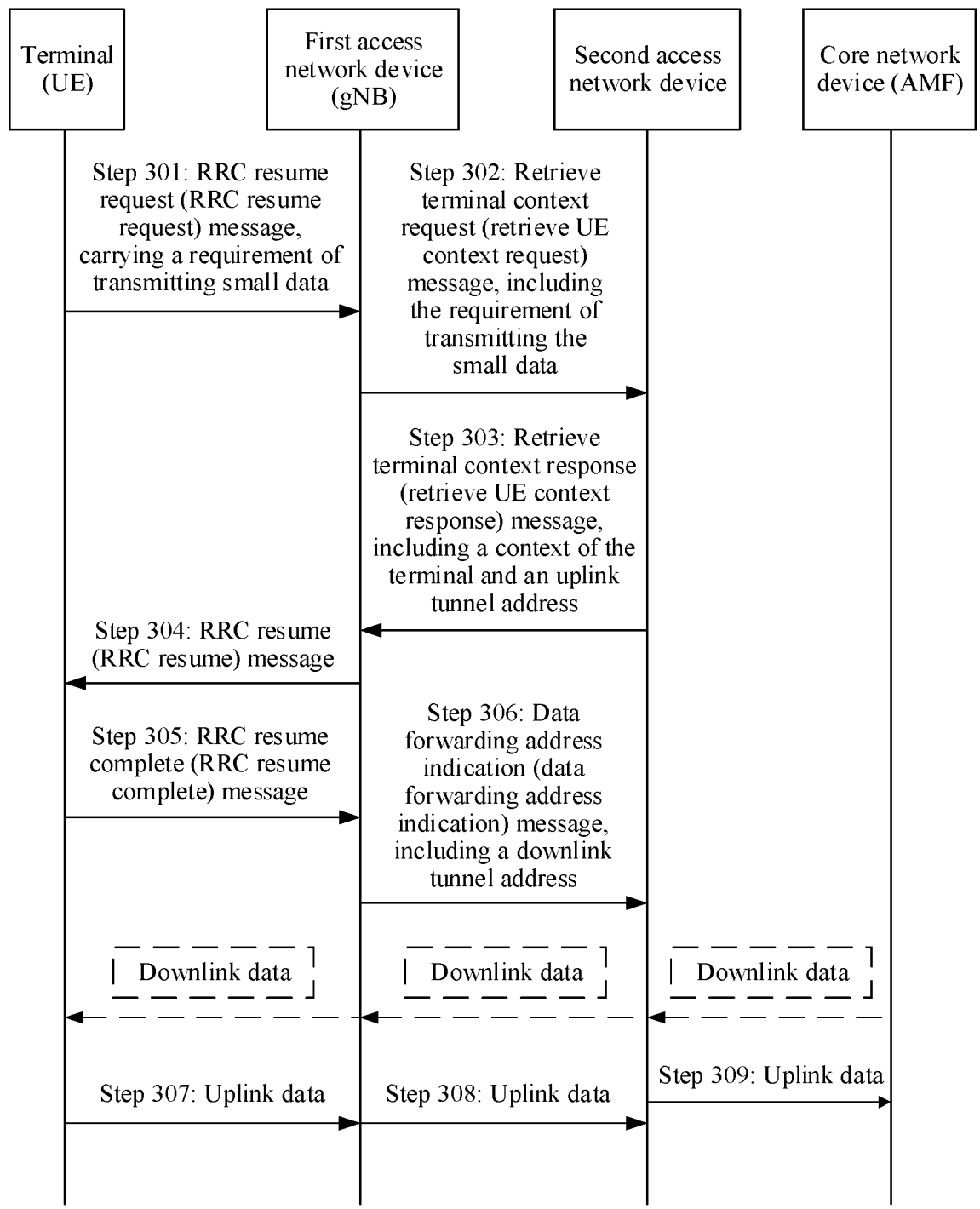
FIG. 3 is a schematic diagram of a data transmission process according to an embodiment of this application.

The following uses FIG. 3 as an example to describe a small data transmission process in detail.

Step 301: A terminal in an inactive state sends a radio resource control resume request message to a first access network device, where the request message carries indication information used to indicate a requirement of transmitting small data.

Correspondingly, the first access network device receives the radio resource control resume request message sent by the terminal in the inactive state.

The indication information used to indicate the requirement of transmitting the small data may be information used to indicate transmission of the small data, information used to indicate that an anchor access network device remains unchanged, information used to indicate that a context of the terminal is not transferred.

Step 302: The first access network device sends, to a second access network device, a retrieve terminal context request message, where the retrieve terminal context request message carries the indication information used to indicate the requirement of transmitting the small data.

Correspondingly, the second access network device receives the retrieve terminal context request message sent by the first access network device, where the retrieve terminal context request message includes the indication information used to indicate the requirement of transmitting the small data.

The indication information used to indicate the requirement of transmitting the small data may be used to notify the second access network device to receive uplink data sent by the first access network device, and send the uplink data to a core network device.

Step 303: The second access network device sends a retrieve terminal context response message to the first access network device, where the response message carries an address of the tunnel used to transmit uplink data.

Correspondingly, the first access network device receives the retrieve terminal context response message sent by the second access network device, where the response message includes the address of the tunnel used to transmit uplink data.

When the first access network device sends the uplink data to the second access network device, the uplink data may be sent by using the address of the tunnel, or may be sent by using interface signaling. A specific manner in which the uplink data is sent may be determined by the second access network device, or may be determined by the first access network device.

An example in which the second access network device determines a manner for uplink data transmission is used for description.

When receiving the indication information used to indicate the requirement of transmitting the small data, the second access network device may learn that the terminal has to-be-transmitted small data, and the second access network device may send, to the first access network device, the address of the tunnel used to transmit uplink data, so that the first access network device transmits the uplink data by using the address of the tunnel.

It may be understood that the second access network device may alternatively not send, to the first access network device, the address of the tunnel used to transmit uplink data. In this case, the first access network device transmits the uplink data to the second access network device by using the interface signaling.

An example in which the first access network device determines a manner for uplink data transmission is used for description.

It may be agreed that if the first access network device sends, to the second access network device, indication information used to indicate to establish an uplink tunnel, it indicates that the first access network device expects to send the uplink data by using the address of the tunnel, and the second access network device notifies the first access network device of the address of the tunnel used to transmit uplink data. Alternatively, if the first access network device does not send, to the second access network device, indication information used to indicate to establish an uplink tunnel, it indicates that the first access network device does not expect to send the uplink data by using the address of the tunnel, and the second access network device does not notify the first access network device of the address of the tunnel used to transmit uplink data. The first access network device directly sends the uplink data by using the interface signaling.

If the first access network device sends, to the second access network device, indication information used to indicate to establish an uplink tunnel address, the indication information used to indicate to establish the uplink tunnel address may be carried in the retrieve terminal context request message in step 302 in FIG. 3, or certainly may be carried in another message, or the indication information used to indicate to establish the uplink tunnel address may be carried by using a message in another format.

The address of the tunnel used to transmit uplink data includes but is not limited to: a protocol data unit PDU session identifier and/or uplink forwarding information, and the like. The uplink forwarding information may include: an uplink data forwarding address corresponding to a PDU session, and specifically includes a transport layer address and a GTP-TEID (GPRS Tunneling Protocol-Tunnel Endpoint Identifier). The transport layer address may be an IP address. Optionally, the uplink forwarding information includes a quality of service flow identifier list corresponding to the PDU session, and each quality of service flow identifier list includes one or more quality of service flow (QoS flow) identifiers.

For example, the uplink forwarding information may further include: at least one data radio bearer list and an uplink data forwarding address corresponding to each data radio bearer list, and specifically includes a transport layer address and a GTP-TEID, The transport layer address may be the IP address. Alternatively, the uplink forwarding information may further include: at least one LCID list and an uplink data forwarding address corresponding to each LCID list.

Optionally, the second access network device may send, to the first access network device, information about retaining the context of the terminal. The first access network device may receive the information that is of retaining the context of the terminal and that is sent by the second access network device, to indicate that the second access network device retains the context of the terminal. For example, the information about retaining the context of the terminal may be carried in the retrieve terminal context response message, or in another message. Therefore, the first access network device does not send a terminal context release message to the second access network device.

Optionally, the second access network device may send, to the first access network device, information used to indicate that an anchor access network device remains unchanged. The first access network device may receive the information that is used to indicate that the anchor access network device remains unchanged and that is sent by the second access network device, to indicate that the second access network device keeps the anchor access network device unchanged. For example, the information used to indicate that the anchor access network device remains unchanged may be carried in the retrieve terminal context response message, or in another message. Therefore, the first access network device does not send the terminal context release message to the second access network device.

Step 304: The first access network device indicates, based on the context of the terminal, the terminal in the inactive state to enter a connected state.

For example, the first access network device may send a radio resource control resume (RRC resume) message to the terminal.

Step 305: After entering the connected state, the terminal may send a radio resource control resume complete (RRC resume complete) message to the first access network device.

Step 306: After the terminal enters the connected state, the first access network device provides the second access network device with an address of a tunnel used to transmit downlink data.

For example, the first access network device may send a data forwarding address indication (data forwarding address indication) message to the second access network device, where the data forwarding address indication message includes the address of the tunnel used to transmit downlink data. Therefore, after receiving downlink data sent by the core network device, the second access network device delivers the downlink data to the first access network device by using the address of the tunnel. In this embodiment of this application, the downlink data may be transmitted by using step 306.

Step 307: The terminal in the connected state sends uplink data to the first access network device.

Step 308: The first access network device receives the uplink data sent by the terminal, and sends the uplink data to the second access network device based on the address of the tunnel used to transmit the uplink data.

If the second access network device does not send, to the first access network device, the address of the tunnel used to transmit the uplink data, after receiving the uplink data sent by the terminal, the first access network device may send the uplink data to the second access network device by using the interface signaling.

Step 309: The second access network device may send the uplink data to the core network device.

In this embodiment of this application, step 207 in which the first access network device sends the path switch request to the core network device and step 208 in which the core network device sends the path switch request response message to the first access network device in FIG. 2 are skipped. In a data transmission process, the core network device does not need to be notified to perform path update, thereby avoiding signaling overheads. Because the second access network device transmits the uplink data to the core network device, step 209 in which the first access network device sends the terminal context release message to the second access network device is also skipped.

Figure 4:
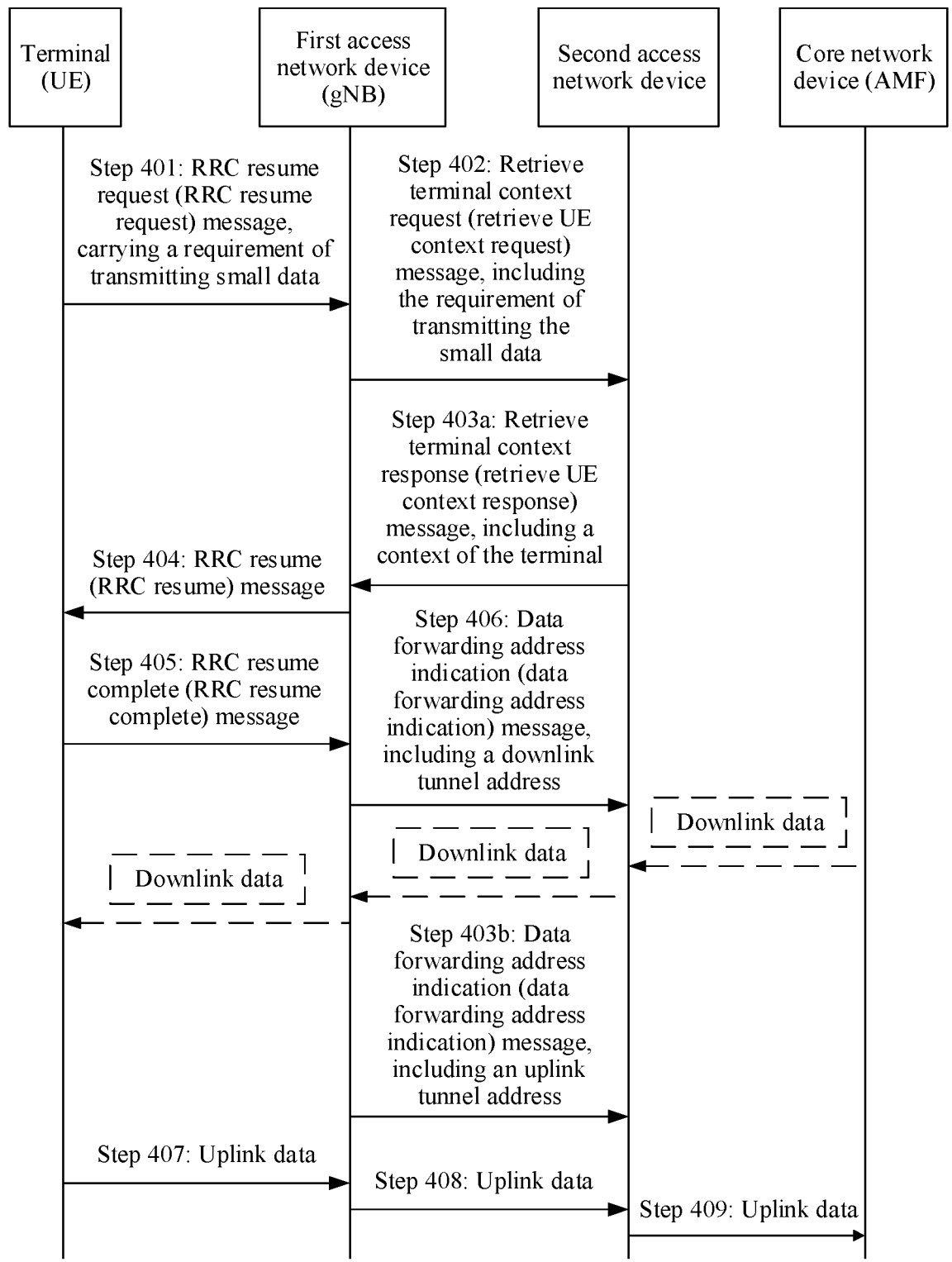
FIG. 4 is a schematic diagram of a data transmission process according to an embodiment of this application.

An embodiment of this application further provides a data transmission process shown in FIG. 4.

Step 401 and step 402 are the same as step 301 and step 302 in FIG. 3.

Step 403*a*: The second access network device sends a retrieve terminal context response (retrieve UE context response) message to the first access network device, where the response message includes the context of the terminal in the inactive state. Step 403*a* is the same as step 203 in FIG. 2.

Step 403*b*: The second access network device receives a data forwarding address indication message sent by the first access network device, where the data forwarding address indication message includes a tunnel address used to transmit uplink data.

Step 404 to step 409 in FIG. 4 are the same as step 304 to step 309 in FIG. 3.

To be specific, a difference between FIG. 4 and FIG. 3 is that, in FIG. 4, the address of the tunnel used to transmit uplink data is carried in a message different from the retrieve terminal context response message.

If the address of the tunnel used to transmit uplink data is sent by using step 403*b* in FIG. 4, step 403*b* is after step 402 in which the first access network device sends the retrieve terminal context request message to the second access network device, and is before step 408 in which the first access network device sends the uplink data to the second access network device based on the address of the tunnel used to transmit uplink data. As shown in FIG. 4, a possible solution is provided. Step 403*b* is after step 406 in which the first access network device sends, to the second access network device, an address of a tunnel used to transmit downlink data, and is before step 407 in which the first access network device receives the uplink data sent by the terminal.

If the first access network device sends the uplink data to the second access network device by using interface signaling, a process may be similar to that in FIG. 4. A difference from FIG. 4 is that step 403*b* does not need to be performed, and step 408 in which the first access network device sends the uplink data to the second access network device based on the address of the tunnel used to transmit uplink data is modified to that the first access network device sends the uplink data to the second access network device based on the interface signaling.

In this embodiment of this application, when the uplink data is transmitted, step 207 in which the first access network device sends the path switch request to the core network device and step 208 in which the core network device sends the path switch request response message to the first access network device in FIG. 2 are skipped. In the data transmission process, the core network device does not need to be notified to perform the path update, thereby avoiding the signaling overheads. Because the second access network device transmits the uplink data to the core network device, step 209 in which the first access network device sends the terminal context release message to the second access network device is also skipped.

In addition, because the downlink data is also sent by the second access network device to the first access network device, then is sent by the first access network device to the terminal, path switch is not performed in a downlink data transmission process.

It should be noted that, in this embodiment of this application, if the first access network device does not send, to the second access network device, the indication information used to indicate the requirement of transmitting the small data, the second access network device may still provide the first access network device with the context of the terminal, and allocate, to the first access network device, the address of the tunnel used to transmit uplink data.

Optionally, the second access network device may send, to the first access network device, information about retaining the context of the terminal. The first access network device may receive the information that is of retaining the context of the terminal and that is sent by the second access network device, to indicate that the second access network device retains the context of the terminal. For example, the information about retaining the context of the terminal may be carried in the retrieve terminal context response message, or in another message. Therefore, the first access network device does not send the terminal context release message to the second access network device.

Optionally, the second access network device may send, to the first access network device, information used to indicate that an anchor access network device remains unchanged. The first access network device may receive the information that is used to indicate that the anchor access network device remains unchanged and that is sent by the second access network device, to indicate that the second access network device keeps the anchor access network device unchanged. For example, the information used to indicate that the anchor access network device remains unchanged may be carried in the retrieve terminal context response message, or in another message. Therefore, the first access network device does not send the terminal context release message to the second access network device.

In the foregoing embodiment, after the terminal in the inactive state leaves the second access network device that serves the terminal last time and moves to a coverage area of the first access network device, the first access network device indicates the terminal to resume to be in a connected state. A tunnel used to transmit the uplink data is established between the second access network device and the first access network device, so that a transmission path for the uplink data of the terminal is: terminal-first access network device-second access network device-core network device. After the terminal moves, the second access network device that serves the terminal last time remains unchanged. After data transmission is complete, the second access network device sends a radio resource control release message to the terminal through the first access network device, so that the terminal enters the inactive state or an idle state. In the data transmission process, the core network device does not need to be notified to perform the path update, thereby reducing the signaling overheads.

In this embodiment of this application, when the terminal in the inactive state has uplink data that needs to be sent, the terminal in the inactive state may directly send the uplink data to the first access network device without waiting for the terminal to resume to be in the connected state. In this case, the uplink data sent by the terminal in the inactive state may be referred to as early uplink data. To avoid the signaling overheads caused by sending the path switch request to the core network device, the first access network device receives the early uplink data sent by the terminal in the inactive state, and may send the early uplink data to the second access network device, and the second access network device sends the early uplink data to the core network device.

When the terminal in the inactive state has to-be-transmitted uplink data, the terminal may send a radio resource control resume request message to the first access network device. The terminal may include the early uplink data in the radio resource control resume request message, and send the message including the early uplink data to the first access network device. Certainly, the early uplink data may alternatively be carried in another message. For example, in a manner, the terminal may include the uplink data in a random access request message. In another manner, the terminal initiates a random access procedure. The terminal first sends a random access request message to an access network device, and receives a random access response message sent by the access network device, and then sends a message 3 to the access network device. The terminal may alternatively include the uplink data in the message 3. In this process, the terminal may include the indication information used to indicate the requirement of transmitting the small data. When the terminal in the idle state has uplink data that needs to be sent to the core network device, the terminal may include the uplink data in an RRC setup request message, the random access request message, or another RRC message.

When the first access network device sends the early uplink data to the second access network device, the early uplink data may be sent by using the address of the tunnel, or may be sent by using the interface signaling. A specific manner in which the early uplink data is sent may be determined by the second access network device, or may be determined by the first access network device. For a process of determining a manner in which the early uplink data is sent by using the address of the tunnel or the interface signaling, refer to the process shown in FIG. 3.

Figure 5:
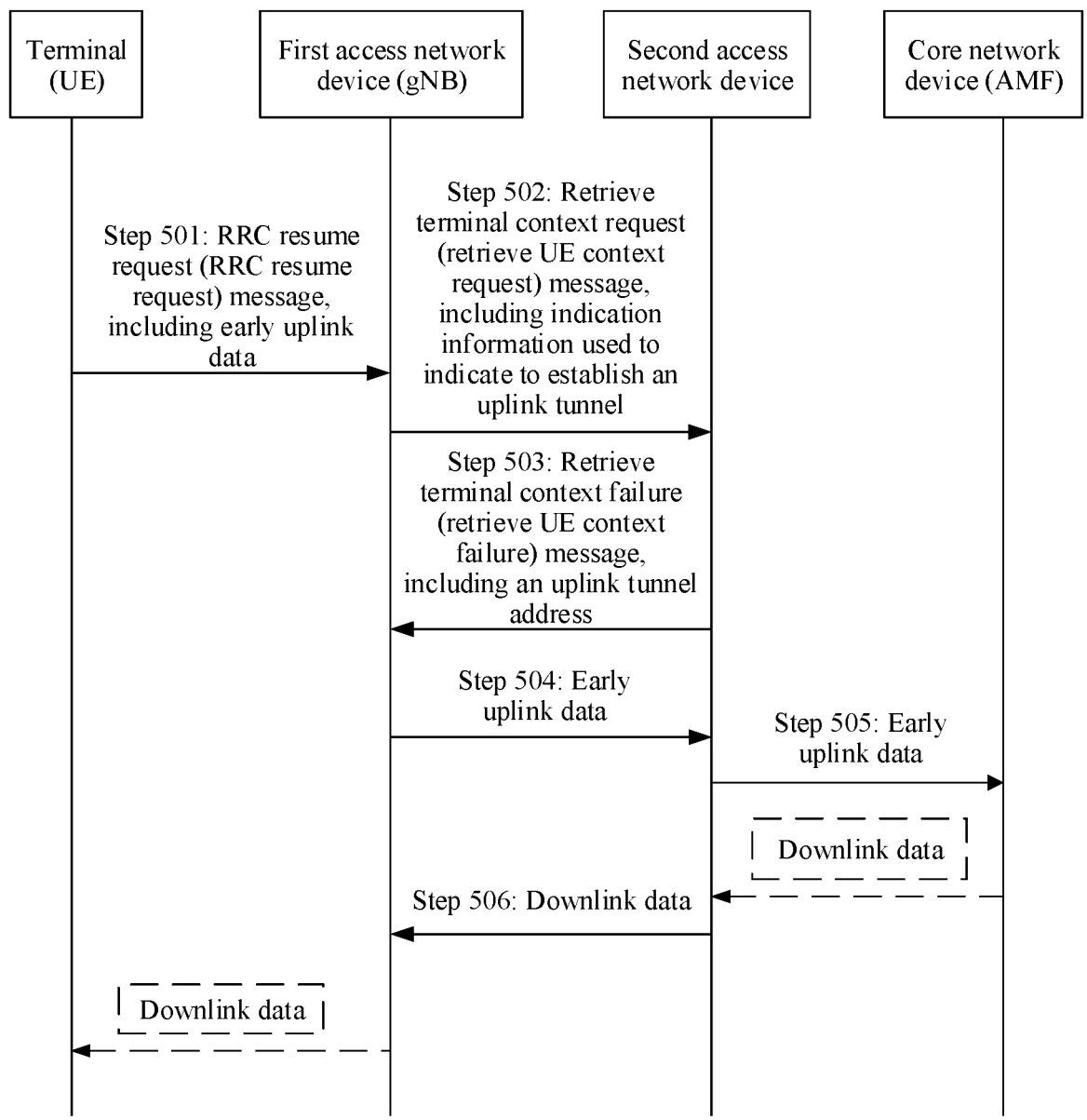
FIG. 5 is a schematic diagram of a data transmission process according to an embodiment of this application.

The following uses FIG. 5 as an example to describe in detail an early uplink data transmission process.

Step 501: A terminal in an inactive state sends a radio resource control resume request (RRC resume request) message to a first access network device, where the radio resource control resume request message includes an I-RNTI configured by a second access network device for the terminal, and early uplink data.

The first access network device receives the radio resource control resume request message sent by the terminal in the inactive state, and learns of an identifier of the second access network device based on the I-RNTI included in the radio resource control resume request message.

The second access network device is a device that configures the terminal to enter the inactive state. When the second access network device switches the terminal from a connected state to the inactive state, the second access network device may notify the terminal of the I-RNTI, so that the terminal may include the I-RNTI in the radio resource control resume request message, to indicate that the terminal expects to enter the connected state.

Step 502: Send a retrieve terminal context request (retrieve UE context request) message to the second access network device.

The first access network device requests a context of the terminal from the second access network device based on the learned identifier of the second access network device. Specifically, the first access network device may send the retrieve terminal context request (retrieve UE context request) message to the second access network device.

The first access network device may further include, in the retrieve terminal context request message, indication information used to indicate to establish an uplink tunnel. In other words, the first access network device requests to establish an uplink tunnel to the second access network device, so that the first access network device sends the early uplink data to the second access network device by using the address of the tunnel.

Because the first access network device already learns of a bearer identifier, a logical channel identifier, or a PDU session identifier of to-be-transmitted early uplink data, to establish only tunnels of bearers or logical channels, the first access network device may further include, in the retrieve terminal context request message, a specific identifier that requests to establish the tunnels. For example, the identifier may be a DBR identifier, a logical channel identifier, or a PDU session identifier.

For example, a logical channel identifier list such as an LCID 1 and an LCID 2 may be included. The second access network device notifies the first access network device in step 503 of the LCID 1 and a UL tunnel address corresponding to the LCID 1, and the LCID 2 and a tunnel address corresponding to the LCID 2.

For example, a DRB identifier list such as a DRB 1 and a DRB 2 may be included. The second access network device notifies the first access network device in step 503 of the DRB 1 and a UL tunnel address corresponding to the DRB 1, and the DRB 2 and a tunnel address corresponding to the DRB 2.

The indication information that is used to indicate to establish the uplink tunnel and that is carried in the retrieve terminal context request message may be sent by the terminal to the first access network device, or may be generated by the first access network device based on a requirement for sending uplink data. If the terminal sends, to the first access network device, the indication information used to indicate to establish the uplink tunnel, a data forwarding address indication message may be carried in the radio resource control resume request message in step 501.

Step 503: The second access network device sends a retrieve terminal context failure (retrieve UE context failure) message to the first access network device.

The failure message is used to notify the first access network device of a retrieve terminal context failure, and the first access network device does not indicate the terminal in the inactive state to enter the connected state. The second access network device may further include, in the failure message, a tunnel address used to transmit uplink data. The first access network device receives the retrieve terminal context failure message sent by the second access network device, where the failure message includes the address of the tunnel used to transmit uplink data.

Step 504: The first access network device sends the early uplink data to the second access network device based on the address of the tunnel used to transmit uplink data.

Step 505: The second access network device may send the uplink data to a core network device.

When the core network device has downlink data to be transmitted to the terminal, the core network device transmits the downlink data to the second access network device, the second access network device transmits the downlink data to the first access network device, and the first access network device transmits the downlink data to the terminal.

The second access network device may send, to the first access network device, the downlink data sent by the core network device to the terminal, and the first access network device sends the downlink data to the terminal.

When the second access network device sends the downlink data to the first access network device, in one manner, the downlink data may be carried in the retrieve terminal context response (retrieve UE context response) message sent by the second access network device to the first access network device in step 503. In other words, the first access network device receives the retrieve terminal context response message sent by the second access network device, where the response message includes the downlink data. In another manner, the downlink data may be sent as a separate message in step 506 in FIG. 5. In still another manner, the second access network device may send the downlink data to the first access network device through a downlink tunnel. For example, the first access network device may send the data forwarding address indication (data forwarding address indication) message shown in step 206 to the second access network device. If the data forwarding address indication message includes a tunnel address used to transmit downlink data, the second access network device may send the downlink data to the first access network device based on the address of the tunnel used to transmit downlink data, and the first access network device receives the downlink data based on the address of the tunnel used to transmit downlink data. The data forwarding address indication message sent by the first access network device to the second access network device may be a separate message, or may be carried in the retrieve terminal context request (retrieve UE context request) message sent by the first access network device to the second access network device in step 502.

In the foregoing embodiment, after the terminal in the inactive state leaves a base station (the second access network device) that serves the terminal last time and moves to a new base station (the first access network device), a tunnel used to transmit the uplink data is established between the new base station and the base station that serves the terminal last time, so that a transmission path for the uplink data of the terminal is: terminal-first access network device-second access network device-core network device, and the base station that serves the terminal last time remains unchanged. In a data transmission process, the core network device does not need to be notified to perform path update, thereby reducing signaling overheads.

Figure 6:
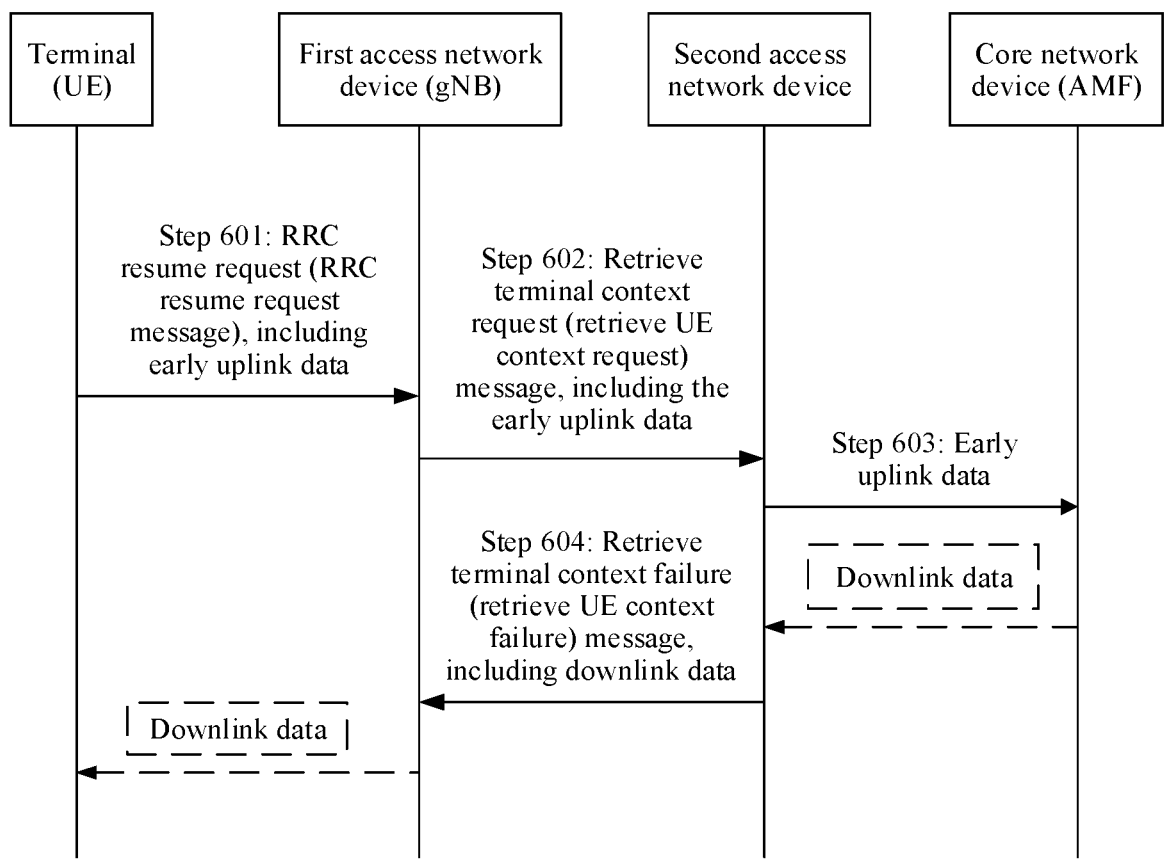
FIG. 6 is a schematic diagram of a data transmission process according to an embodiment of this application.

An embodiment of this application further provides an early uplink data transmission process shown in FIG. 6.

Step 601 is the same as step 501 in FIG. 5.

Step 602: The first access network device sends a retrieve terminal context request (retrieve UE context request) message to the second access network device, where the request message carries the early uplink data.

Step 603: The second access network device sends the early uplink data to a core network device.

Step 604: The second access network device sends a retrieve terminal context failure message to the first access network device, to notify the first access network device of a retrieve terminal context failure, and the first access network device does not indicate the terminal in the inactive state to enter the connected state.

The second access network device may also send downlink data to the first access network device, where the downlink data may be carried in the retrieve terminal context failure message in step 604, or the downlink data may be sent through a separate message.

For a downlink data transmission process, refer to the foregoing listed manners. That the second access network device includes, in the retrieve terminal context failure message, downlink data sent by a core network device to the terminal is only listed in FIG. 6. In other words, in step 604, the first access network device receives the retrieve terminal context failure message sent by the second access network device, where the failure message includes the downlink data.

In the foregoing embodiment, after the terminal in the inactive state leaves the second access network device that serves the terminal last time and moves to a coverage area of the first access network device, the terminal sends the early uplink data to the first access network device when the terminal is in the inactive state. A transmission path for the early uplink data of the terminal is: terminal-first access network device-second access network device-core network device. After the terminal moves, the second access network device that serves the terminal last time remains unchanged.

In a data transmission process, the core network device does not need to be notified to perform path update, thereby reducing signaling overheads.

In an architecture in which a centralized unit (centralized unit, CU) and a distributed unit (distributed unit, DU) are split, an access network device may include two parts: the DU and the CU. Division into the CU and the DU may be based on a protocol layer of a wireless network. For example, functions of a PDCP layer and a layer above the PDCP layer are set on the CU, and functions of protocol layers below the PDCP layer, such as an RLC layer and a MAC layer, are set on the DU. In other words, the CU has functions of layers (including the PDCP layer, an RRC layer, and an SDAP layer) above the PDCP layer, and the DU has functions of layers (including the RLC layer, the MAC layer, and a PHY layer) below the PDCP layer. Division based on the protocol layer is merely an example, and division may alternatively be performed at another protocol layer such as the RLC layer. Functions of the RLC layer and protocol layers above the RLC layer are set on the CU, and functions of protocol layers below the RLC layer are set on the DU. Alternatively, division is performed at a protocol layer. For example, a part of functions of the RLC layer and functions of protocol layers above the RLC layer are set on the CU, and a remaining function of the RLC layer and functions of protocol layers below the RLC layer are set on the DU. In addition, division may alternatively be performed in another manner. For example, division is performed based on a delay. A function whose processing time needs to meet a delay requirement is set on the DU, and a function whose processing time does not need to meet the delay requirement is set on the CU. One DU may support one or more cells.

In addition, a radio frequency apparatus may be not placed in the DU and is placed remotely from the DU, or may be integrated into the DU, or a part of the radio frequency apparatus is placed remotely from the DU and a remaining part is integrated into the DU. This is not limited herein.

An interface between the DU and the terminal is referred to as a Uu interface, an interface between the DU and the CU is referred to as an F1 interface, and an interface between the CU and another access network device is referred to as an Xn interface.

Figure 7:
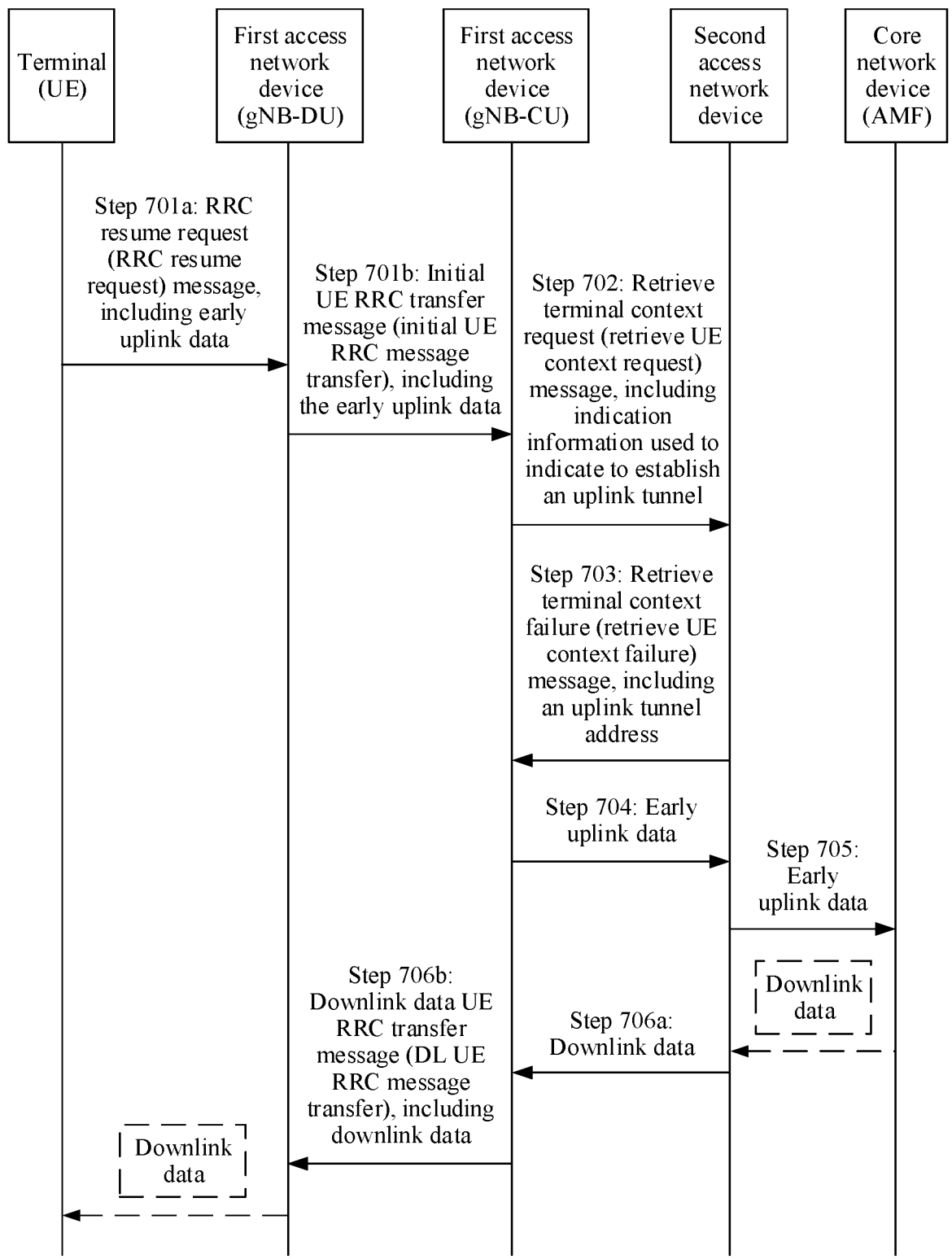
FIG. 7 is a schematic diagram of a data transmission process according to an embodiment of this application.

With reference to FIG. 5, an early uplink data transmission process in a CU-DU split architecture is described in detail. For details, refer to FIG. 7.

Step 701a: A terminal in an inactive state sends a radio resource control resume request (RRC resume request) message to a DU, where the radio resource control resume request message includes an I-RNTI configured by a second access network device for the terminal, and early uplink data.

The DU receives the radio resource control resume request message sent by the terminal in the inactive state.

A difference between step 701a and step 501 in FIG. 5 is that the first access network device in step 501 in FIG. 5 is replaced with the DU.

Step 701b: The DU sends an initial UE RRC transfer message to a CU.

An identifier of the second access network device may be learned based on the I-RNTI in the radio resource control resume request message sent by the terminal to the DU. The DU may learn of the identifier of the second access network device based on the I-RNTI, and the initial UE RRC transfer message includes the identifier of the second access network device. Alternatively, the DU may send the radio resource control resume request message to the CU, the CU learns of the identifier of the second access network device based on the I-RNTI, and the initial UE RRC transfer message includes the I-RNTI.

In an implementation, the initial UE RRC transfer message includes the early uplink data.

In another implementation, because the DU already learns of a bearer identifier, a logical channel identifier, or a PDU session identifier of to-be-transmitted early uplink data, to establish only tunnels of bearers or logical channels, the DU may further include, in the retrieve terminal context request message, a specific identifier that requests to establish the tunnels. For example, the identifier may be a DBR identifier, a logical channel identifier, or a PDU session identifier.

For example, a logical channel identifier list such as an LCID 1 and an LCID 2 may be included. The CU notifies the DU in step 702 of the LCID 1 and a UL tunnel address corresponding to the LCID 1, and the LCID 2 and a tunnel address corresponding to the LCID 2.

For example, a DRB identifier list such as a DRB 1 and a DRB 2 may be included. The CU notifies the DU in step 702 of the DRB 1 and a UL tunnel address corresponding to the DRB 1, and the DRB 2 and a tunnel address corresponding to the DRB 2.

Step 702: The CU requests a context of the terminal from the second access network device. Specifically, the CU may send a retrieve terminal context request (retrieve UE context request) message to the second access network device, where the retrieve terminal context request message includes indication information used to indicate to establish an uplink tunnel, and may further include a type of the uplink tunnel.

A difference between step 702 and step 502 in FIG. 5 is that the first access network device in step 502 in FIG. 5 is replaced with the CU.

Step 703: The second access network device sends a retrieve terminal context failure (retrieve UE context failure) message to the CU, to notify the CU of a retrieve terminal context failure. The second access network device may further include downlink data in the failure message. In other words, the CU receives the retrieve terminal context failure message sent by the second access network device, where the failure message includes a tunnel address used to transmit uplink data.

A difference between step 703 and step 503 in FIG. 5 is that the first access network device in step 503 in FIG. 5 is replaced with the CU.

Step 704: The CU sends the early uplink data to the second access network device based on the address of the tunnel used to transmit uplink data.

A difference between step 704 and step 504 in FIG. 5 is that the first access network device in step 504 in FIG. 5 is replaced with the CU.

Step 705: The second access network device sends the uplink data to a core network device. This step is the same as step 505 in FIG. 5.

Step 706a: The second access network device sends the downlink data to the CU, and the CU receives the downlink data sent by the second access network device.

A difference between step 706a and step 506 in FIG. 5 is that the first access network device in step 506 in FIG. 5 is replaced with the CU.

Step 706b: The CU sends a downlink data UE RRC transfer message (DL UE RRC transfer message) to the DU, where the downlink data UE RRC transfer message includes the downlink data.

The DU may subsequently send the downlink data to the terminal.

Figure 8:
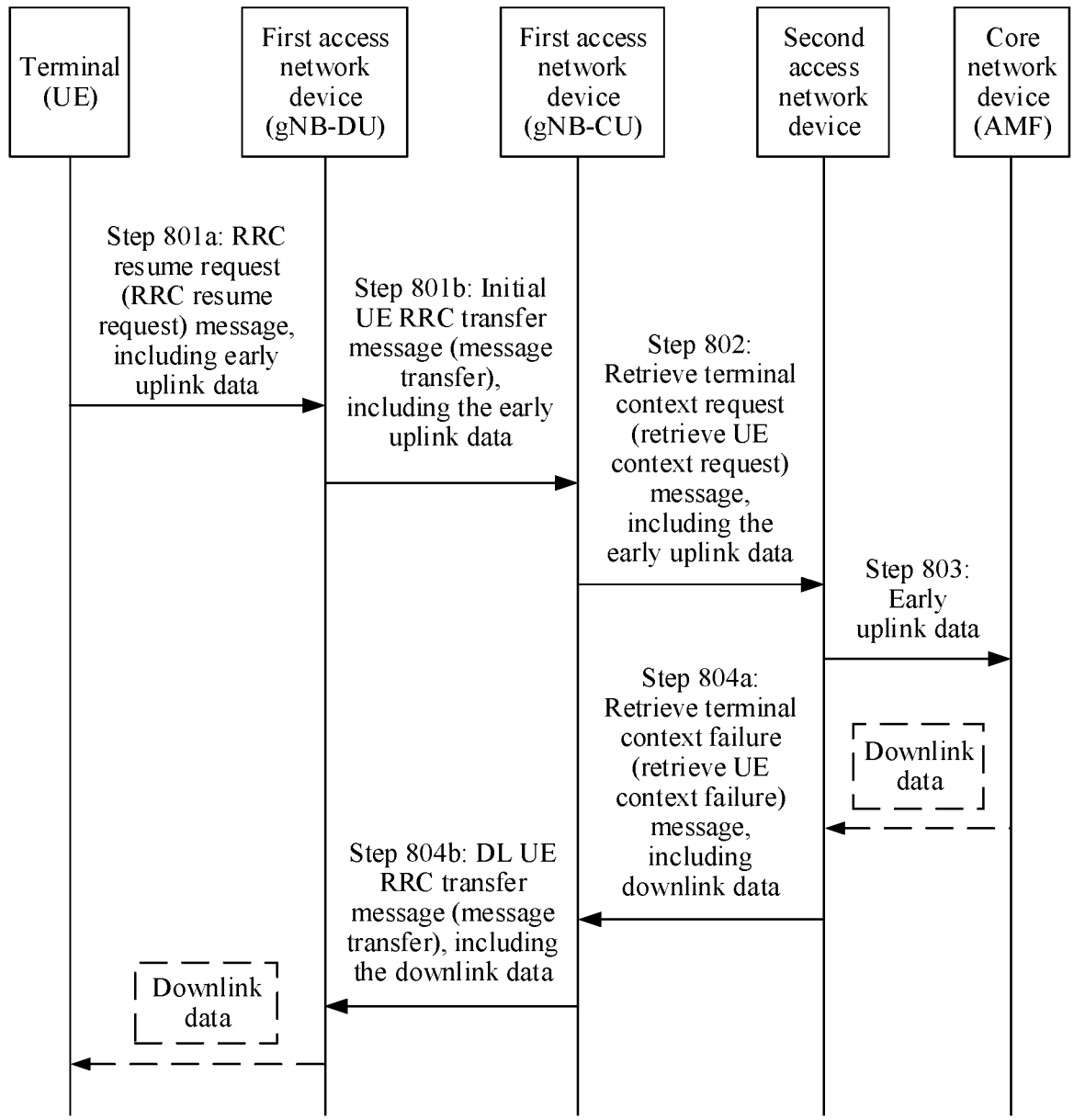
FIG. 8 is a schematic diagram of a data transmission process according to an embodiment of this application.

With reference to FIG. 6, an early uplink data transmission process in a CU-DU split architecture is described in detail. For details, refer to FIG. 8.

Step 801a: A terminal in an inactive state sends a radio resource control resume request (RRC resume request) message to a DU, where the radio resource control resume request message includes an I-RNTI configured by a second access network device for the terminal, and early uplink data.

Correspondingly, the DU receives the radio resource control resume request message sent by the terminal in the inactive state.

A difference between step 801a and step 601 in FIG. 6 is that the first access network device in step 601 in FIG. 6 is replaced with the DU.

Step 801b: The DU sends an initial UE RRC transfer message to a CU, where the initial UE RRC transfer message includes the early uplink data.

The DU sends the radio resource control resume request message to the CU, the CU learns of an identifier of the second access network device based on the I-RNTI, and the initial UE RRC transfer message includes the I-RNTI.

Step 802: The CU requests a context of the terminal from the second access network device based on the identifier of the second access network device. Specifically, the CU may send a retrieve terminal context request (retrieve UE context request) message to the second access network device, where the request message carries the early uplink data.

A difference between step 802 and step 602 in FIG. 6 is that the first access network device in step 602 in FIG. 6 is replaced with the CU.

Step 803: The second access network device sends the early uplink data to a core network device.

Step 804a: The second access network device sends a retrieve terminal context failure (retrieve UE context failure) message to the CU, to notify the CU of a retrieve terminal context failure. The second access network device may further include downlink data in the failure message. In other words, the CU receives the retrieve terminal context failure message sent by the second access network device, where the failure message includes the downlink data.

A difference between step 804a and step 604 in FIG. 6 is that the first access network device in step 604 in FIG. 6 is replaced with the CU.

Step 804b: The CU sends a downlink data UE RRC transfer message (DL UE RRC transfer message) to the DU, where the downlink data UE RRC transfer message includes the retrieve terminal context failure (retrieve UE context failure) message, and the downlink data.

The DU may subsequently send the downlink data to the terminal.

In this embodiment of this application, an uplink tunnel may be established between the DU and the CU to transmit the uplink data, or a downlink tunnel may be established to transmit the downlink data. If the uplink data is transmitted through the uplink tunnel, the initial UE RRC transfer message sent by the DU to the CU may not include the early uplink data, but include indication information used to indicate to establish the uplink tunnel, where the indication information includes one or more of the following: an LCID list, a DRB ID list, and a PDU session list.

The CU may send, to the DU, an address of the tunnel used to transmit uplink data. Specifically, the CU may send the downlink data UE RRC transfer message to the DU, where the downlink data UE RRC transfer message includes the address of the tunnel used to transmit uplink data. Certainly, a message in a new format may also be specified between the DU and the CU to carry the address of the tunnel used to transmit uplink data.

The address of the tunnel used to transmit uplink data is the same as the foregoing tunnel address, and details are not described herein again.

A process of establishing a tunnel between the DU and the CU is similar to the foregoing process of establishing a tunnel between the access network devices, and same details are not described again.

When the terminal in an idle state has uplink data or signaling that needs to be transmitted, the terminal may send the uplink data or the signaling to the DU. The uplink data or the signaling may be carried in an RRC setup request message, a random access request message, or another RRC message that is sent by the terminal to the DU.

A process in which the terminal in the idle state sends the early uplink data or the signaling and transmits the uplink data or the signaling between the CU and the DU is similar to the foregoing uplink data sending process. For example, the uplink tunnel may be established between the DU and the CU to transmit the uplink data, or the downlink tunnel may be established to transmit the downlink data. If the uplink data is transmitted through the uplink tunnel, the initial UE RRC transfer message sent by the DU to the CU may not include the early uplink data, but include the indication information used to indicate to establish the uplink tunnel, where the indication information includes one or more of the following: an LCID list, a DRB ID list, and a PDU session list. Same details are not described again. The uplink data or the signaling is transmitted between the CU and the DU, thereby reducing signaling overheads between the terminal and the first access network device.

In this embodiment of this application, the terminal in a dual connectivity state not only establishes a communication connection to a primary device (generally, a base station), but also establishes a communication connection to a secondary device. For example, the primary device is a device 1, and the secondary device is a device 2. If the device 1 switches the terminal from a connected state to the inactive state, the device 1 notifies the terminal to release an underlying configuration of dual connectivity (that is, the device 2), including a configuration of an RLC layer, a configuration of a MAC layer, and the like.

If the terminal in the inactive state moves to a coverage area of the secondary device (the device 2) during movement, that is, when the terminal performs cell reselection, the terminal reselects the device 2. In this case, if the terminal has to-be-transmitted uplink data that needs to be sent, because the primary device has released the underlying configuration of the dual connectivity, the terminal performs the process shown in FIG. 2, sends an RRC resume message to the secondary device, and subsequently transmits the uplink data through a secondary base station. In this case, the core network device needs to be notified to perform path switching, resulting in signaling overheads. How to resume the dual connectivity of the terminal and avoid the signaling overheads caused by the path switching is a technical problem that needs to be resolved. Based on this, this application provides a data transmission method. The first access network device may send, to the second access network device (the primary device), indication information used to indicate to establish the dual connectivity for the terminal, and indicate that the second access network device is the primary access network device, and the first access network device is the secondary access network device. After the second access network device establishes the dual connectivity for the terminal, if the first access network device receives the uplink data sent by the terminal, the first access network device may send the uplink data to the second access network device, and the second access network device sends the uplink data to the core network device. In a data transmission process, the core network device does not need to be notified to perform path update, thereby avoiding the signaling overheads.

It should be noted that the connectivity in this application may also be referred to as a connection.

The indication information that is used to indicate to establish the dual connectivity for the terminal and that is sent by the first access network device to the second access network device may be generated by the first access network device based on deployment of the first access network device. For example, when the first access network device supports only an industrial network, the first access network device generates the indication information used to indicate to establish the dual connectivity for the terminal, or when a delay-sensitive terminal accesses the first access network device, the first access network device generates the indication information used to indicate to establish the dual connectivity for the terminal. Alternatively, the indication information may be sent by the terminal to the first access network device.

If the terminal sends, to the first access network device, the indication information used to indicate to establish the dual connectivity for the terminal, the indication information used to indicate to establish the dual connectivity for the terminal may be carried in the radio resource control resume request message in step 201 in FIG. 2, or certainly may be carried in another message. Alternatively, the indication information may be carried in a message in another format. A manner in which the terminal sends the indication information is not limited in this embodiment of this application.

When the first access network device sends, to the second access network device, the indication information used to indicate to establish the dual connectivity for the terminal, the indication information used to indicate to establish the dual connectivity for the terminal may be carried in the retrieve terminal context request message in step 202 in FIG. 2, or certainly may be carried in another existing message. Alternatively, a message in a new format is specified to carry the indication information used to indicate to establish the dual connectivity for the terminal.

The indication information used to indicate to establish the dual connectivity for the terminal includes but is not limited to one or more of the following: information used to indicate transmission of the small data, information used to indicate that an anchor access network device remains unchanged, information used to indicate to establish the dual connectivity, or information used to indicate that the context of the terminal is not transferred.

When the first access network device sends the uplink data to the second access network device, the uplink data may be sent by using the address of the tunnel, or may be sent by using interface signaling.

Figure 9A:
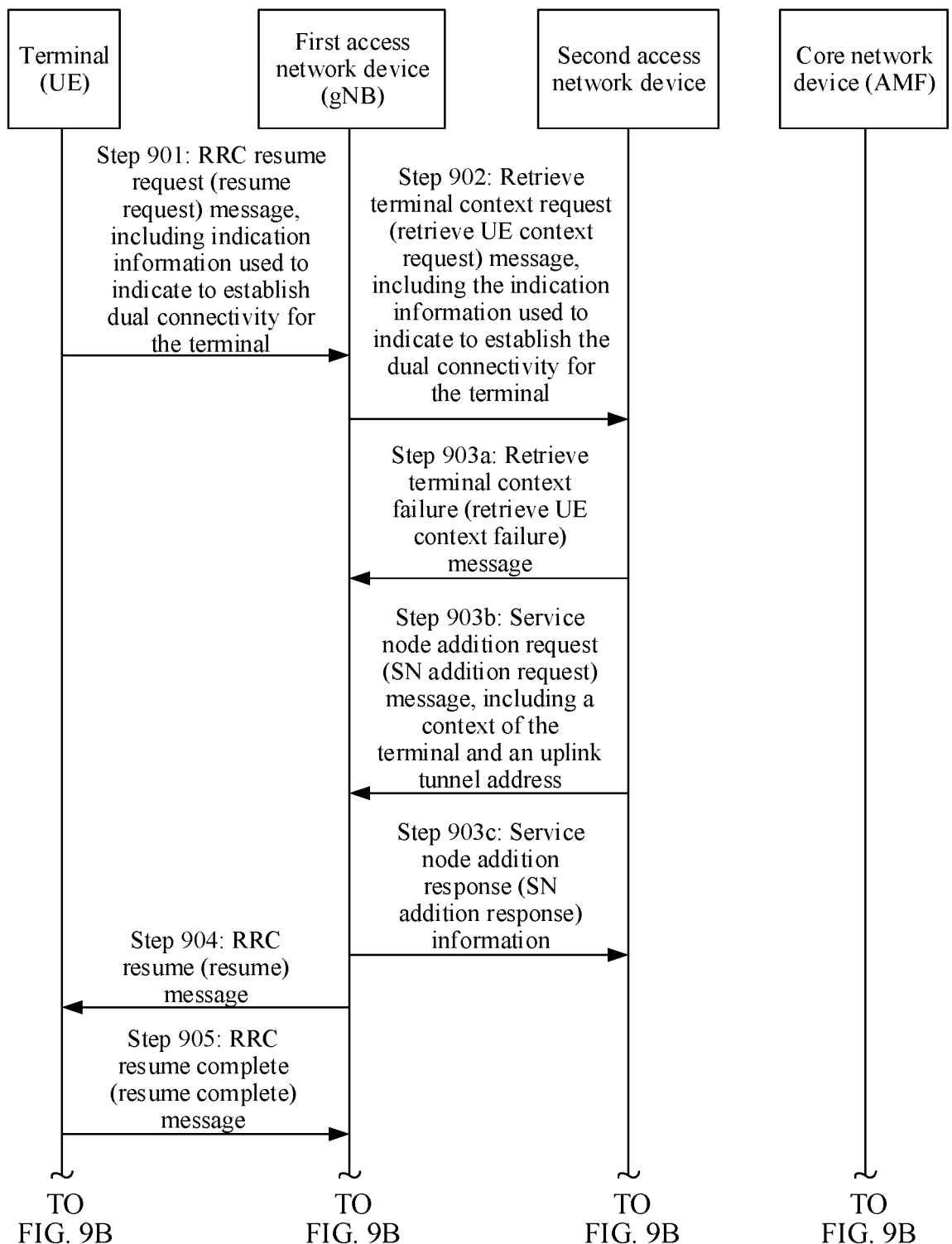
FIG. 9A and FIG. 9B are a schematic diagram of a data transmission process according to an embodiment of this application.
Figure 9B:
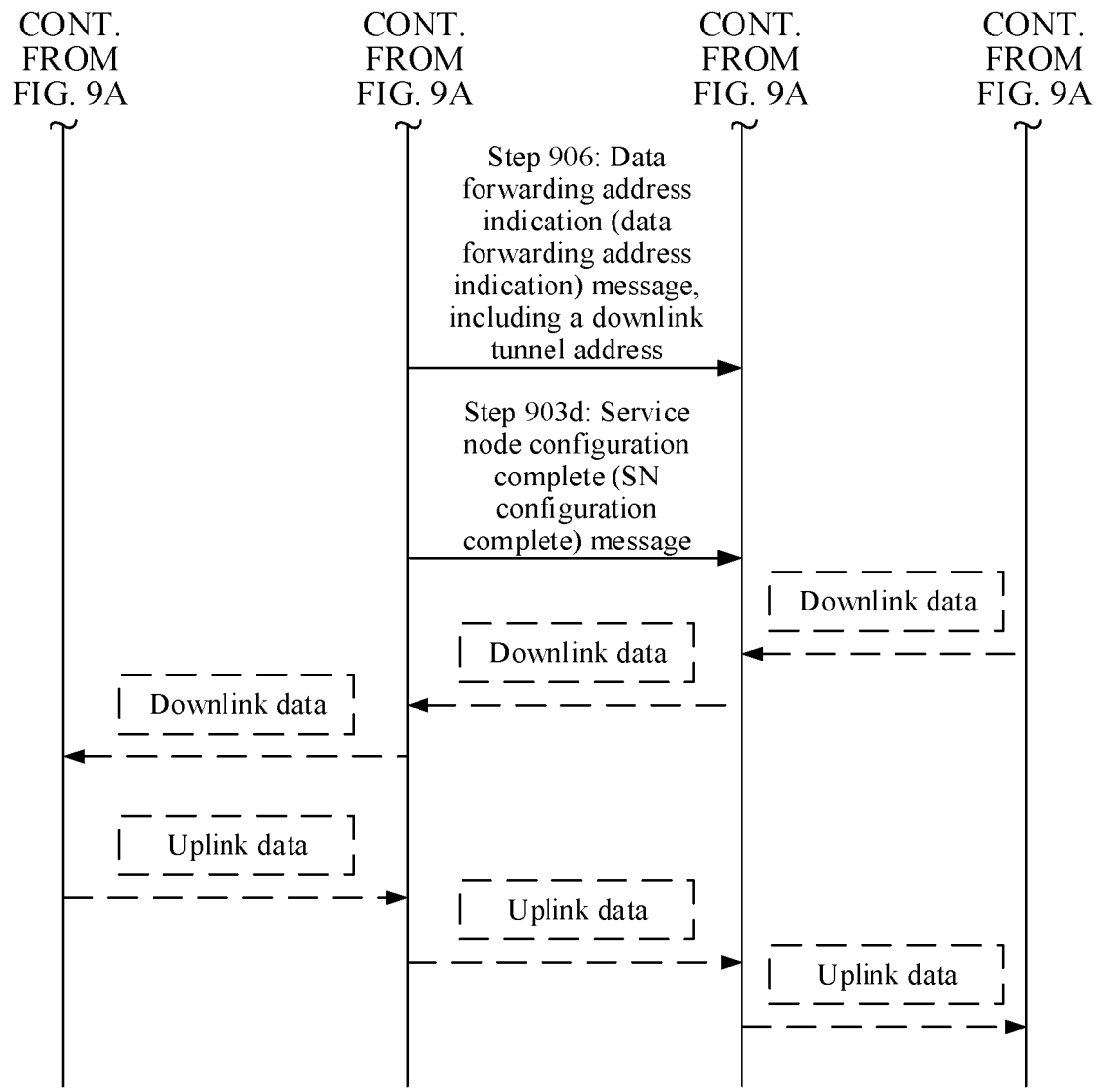

The following uses FIG. 9A and FIG. 9B as an example to describe a data transmission process in detail.

Step 901: A terminal sends a radio resource control resume request message to a first access network device, where the request message carries indication information used to indicate to establish dual connectivity for the terminal. In other words, the first access network device receives the radio resource control resume request message sent by the terminal in an inactive state, and the radio resource control resume request message includes the indication information used to indicate to establish the dual connectivity for the terminal.

The indication information used to indicate to establish the dual connectivity for the terminal may be information used to indicate transmission of the small data, information used to indicate that an anchor access network device remains unchanged, information used to indicate to establish the dual connectivity, or information used to indicate that a context of the terminal is not transferred.

Step 902: The first access network device sends a retrieve terminal context request message to a second access network device, where the retrieve terminal context request message carries the indication information used to indicate to establish the dual connectivity for the terminal. In other words, the second access network device receives the retrieve terminal context request message sent by the first access network device, where the retrieve terminal context request message includes the indication information used to indicate to establish the dual connectivity for the terminal.

The indication information used to indicate to establish the dual connectivity for the terminal may be used to notify the second access network device to receive uplink data sent by the first access network device and send the uplink data to a core network device.

Step 903a: The first access network device receives a retrieve terminal context failure (retrieve UE context failure) message sent by the second access network device.

The retrieve terminal context failure message includes but is not limited to one or more of the following: information used to indicate that small data is transmitted, information used to indicate that an anchor access network device remains unchanged, information used to indicate to establish the dual connectivity, or information used to indicate that a context of the terminal is not transferred.

Step 903b: The first access network device receives a service node addition (SN addition) request message sent by the second access network device, where the service node addition request message includes the context of the terminal and a tunnel address used to transmit uplink data.

The indication information used to indicate to establish an uplink tunnel address may be carried in the retrieve terminal context response message in step 903a in FIG. 9A and FIG. 9B. Certainly, the indication information may alternatively be carried in another existing message. Alternatively, a message in a new format is specified to carry the address of the tunnel used to transmit uplink data.

The second access network device establishes the dual connectivity for the terminal. The second access network device may serve as a primary access network device, and use the first access network device as a secondary access network device based on the indication information. In this case, the second access network device may send the service node addition request message to the first access network device, to query whether the first access network device agrees to serve as the secondary access network device of the terminal.

Step 903c: The first access network device sends service node addition response (SN addition response) information to the second access network device.

If the first access network device agrees to serve as the secondary access network device of the terminal, the first access network device may send the service node addition response information to the second access network device.

Step 904: The first access network device indicates, based on the context of the terminal, the terminal in the inactive state to enter a connected state. Specifically, the first access network device may send a radio resource control resume (RRC resume) message to the terminal. This step is the same as step 204 in FIG. 2.

The terminal enters the connected state from the inactive state.

Step 905: After entering the connected state, the terminal may send a radio resource control resume complete (RRC resume complete) message to the first access network device. This step is the same as step 205 in FIG. 2.

Step 906: The first access network device sends a data forwarding address indication (data forwarding address indication) message to the second access network device.

After determining that the terminal enters the connected state, the first access network device may provide the second access network device with an address of a tunnel used to transmit downlink data. Specifically, the first access network device may send the data forwarding address indication (data forwarding address indication) message to the second access network device, where the data forwarding address indication message includes the address of the tunnel used to transmit downlink data. Therefore, after receiving downlink data sent by the core network device, the second access network device delivers the downlink data to the first access network device by using the address of the tunnel.

Step 903*d*: After determining that the terminal enters the connected state, that is, after step 907, the first access network device may send a service node configuration complete (SN configuration complete) message to the second access network device.

The terminal in the connected state may subsequently send the uplink data to the first access network device. After receiving the uplink data sent by the terminal in the connected state, the first access network device may send the uplink data to the second access network device by using the address of the tunnel used to transmit uplink data in step 903*b*. Then the second access network device sends the uplink data to the core network device.

In this embodiment of this application, the terminal may alternatively be in a multi-connectivity state. The terminal may be connected to the second access network device (the primary access network device) and the first access network device (the secondary access network device), and may be further connected to another access network device. In this case, after receiving the uplink data sent by the terminal in the connected state, the first access network device sends the uplink data to the another access network device, and the another access network device sends the uplink data to the second access network device. If there is one another access network device, the terminal is in a tri-connectivity state; if there are two other access network devices, the terminal is in a four-connectivity state, and the rest may be deduced by analogy.

When the first access network device sends the uplink data to the second access network device, the uplink data may be sent by using the address of the tunnel, or may be sent by using interface signaling. A specific manner in which the uplink data is sent may be determined by the second access network device, or may be determined by the first access network device. For a process of determining a manner in which the uplink data is sent by using the address of the tunnel or the interface signaling, refer to the process shown in FIG. 3.

If the first access network device sends the uplink data to the second access network device by using the interface signaling, the second access network device does not need to send, to the first access network device, the address of the tunnel used to transmit uplink data, and the first access network device sends the uplink data to the second access network device based on the interface signaling.

In this embodiment, the first access network device may also send, to the second access network device, indication information used to indicate to establish an uplink tunnel. A sending process is similar to a process in a corresponding embodiment in FIG. 3, and details are not described herein again.

Figure 10:
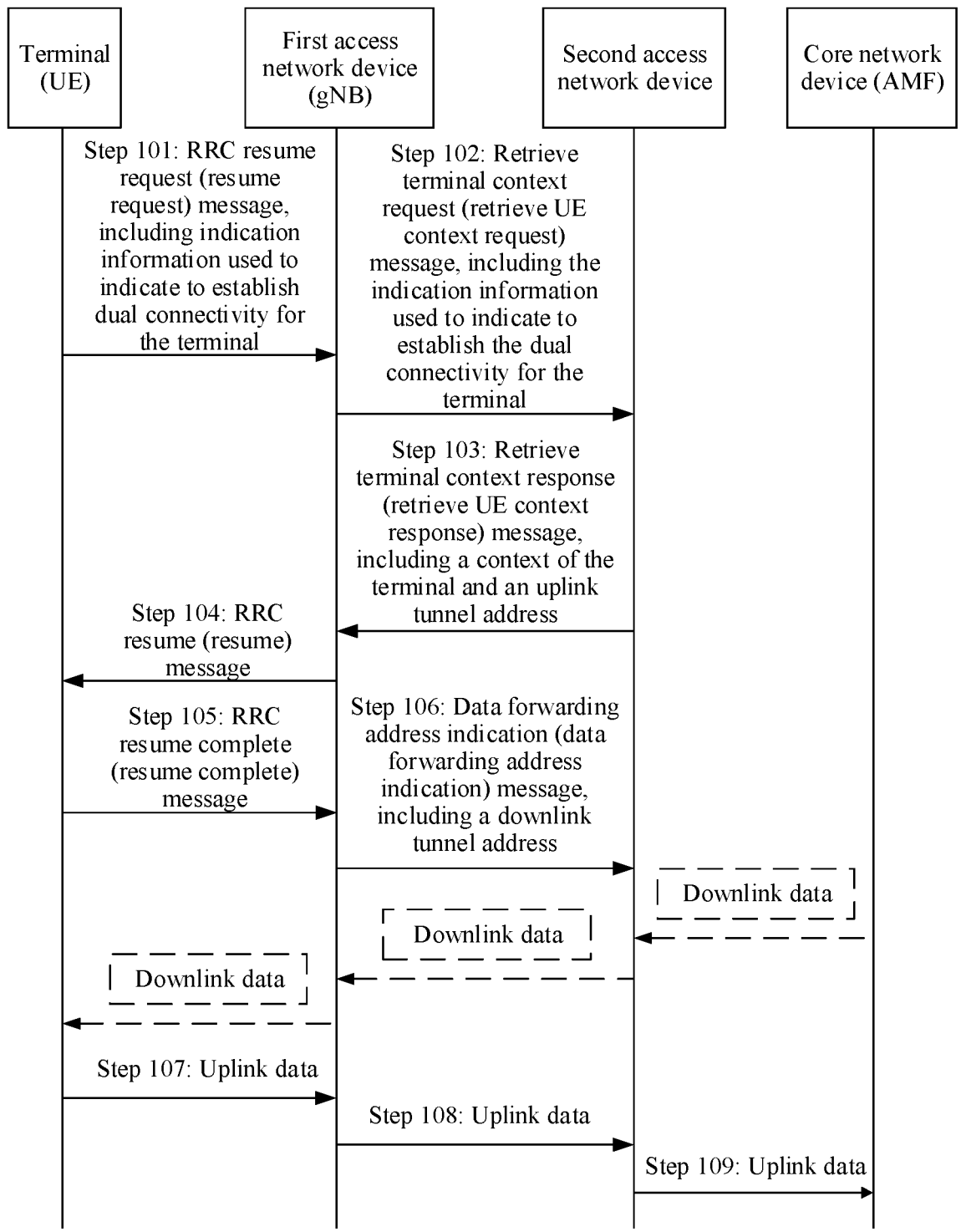
FIG. 10 is a schematic diagram of a data transmission process according to an embodiment of this application.

An embodiment of this application further provides a data transmission process shown in FIG. 10.

Step 101 and step 102 are the same as step 901 and step 902 in FIG. 9A and FIG. 9B.

Step 103: The second access network device sends a retrieve terminal context response (retrieve UE context response) message to the first access network device, where the response message includes a context of the terminal and a tunnel address used to transmit uplink data.

The retrieve terminal context response information includes but is not limited to one or more of the following: information used to indicate to resume a connected state, an address of the tunnel used to transmit uplink data (UL tunnel address), MN terminated SCG bearer (MN terminated SCG bearer) configuration information, and signaling radio bearer SRB configuration information.

Step 104: The first access network device indicates, based on the context of the terminal, the terminal in the inactive state to enter a connected state. Specifically, the first access network device may send a radio resource control resume (RRC resume) message to the terminal. This step is the same as step 906 in FIG. 9A and FIG. 9B.

The terminal enters the connected state from the inactive state.

Step 105: After entering the connected state, the terminal may send a radio resource control resume complete (RRC resume complete) message to the first access network device. This step is the same as step 907 in FIG. 9A and FIG. 9B.

The terminal in the connected state may subsequently send uplink data to the first access network device. After receiving the uplink data sent by the terminal in the connected state, the first access network device may send the uplink data to the second access network device by using the address of the tunnel used to transmit uplink data in step 904, and the second access network device sends the uplink data to a core network device.

Step 106: The first access network device sends a data forwarding address indication (data forwarding address indication) message to the second access network device.

After determining that the terminal enters the connected state, that is, after step 105, the first access network device may provide the second access network device with an address of a tunnel used to transmit downlink data. Specifically, the first access network device may send the data forwarding address indication (data forwarding address indication) message to the second access network device, where the data forwarding address indication message includes the address of the tunnel used to transmit downlink data. Therefore, after receiving downlink data sent by the core network device, the second access network device delivers the downlink data to the first access network device by using the address of the tunnel.

Step 107: The terminal in the connected state sends the uplink data to the first access network device.

Step 108: The first access network device receives the uplink data sent by the terminal, and sends the uplink data to the second access network device based on the address of the tunnel used to transmit uplink data.

Step 109: The second access network device may send the uplink data to the core network device.

In the foregoing embodiment, the first access network device sends, to the second access network device, indication information used to indicate to establish dual connectivity for the terminal, to resume a dual connectivity state of the terminal, so that the first access network device subsequently sends the uplink data of the terminal to the second access network device, and the second access network device sends the uplink data to the core network device. The core network device does not need to be notified to perform path switching, thereby avoiding signaling overheads.

It should be noted that only implementations are provided in the foregoing embodiments. Simple modifications based on the manners described in the foregoing embodiments all fall within the protection scope of this application. For example, when sending the uplink data to the second access network device, a determining process of whether the first access network device sends the uplink data through the uplink tunnel or by using interface signaling is applicable to the embodiments. For another example, the first access network device sends the data forwarding address indication (data forwarding address indication) message to the second access network device, where the data forwarding address indication message includes the address of the tunnel used to transmit downlink data. This is applicable to the embodiments. In other words, data exchange between the terminal and the first access network device, and between the first access network device and the second access network device may be extended by mutual reference in the embodiments, and implementations obtained after the extension by the mutual reference fall within the protection scope of this application.

In this embodiment of this application, the first access network device may further determine whether the terminal completes uplink data transmission. When determining that the terminal completes the uplink data transmission, the first access network device may send an uplink data transmission end indication message to the second access network device, where the uplink data transmission end indication message may be used to indicate that the terminal completes the uplink data transmission. The uplink data transmission end indication message may be represented by using an end marker (end marker) packet transmitted through the address of the tunnel used to transmit uplink data. Alternatively, the indication message may be the interface signaling, to indicate that a PDU session ends uplink transmission or a data bearer ends uplink transmission.

A process in which the first access network device determines whether the terminal completes the uplink data transmission may be notified by the terminal to the first access network device, or may be determined by the first access network device according to a time for sending data. For example, a timer is set, and after the timer expires, it is considered that the terminal completes the uplink data transmission. Alternatively, the process may be determined with assistance of the core network device. For example, the core network device notifies the first access network device of a quantity of packets that can be transmitted by the terminal, and when the first access network device identifies that the terminal transmitted a maximum quantity of packets, it is considered that the terminal completes the uplink data transmission.

Certainly, the second access network device may also determine whether the core network device completes downlink data transmission. When the second access network device determines that the core network device completes the downlink data transmission, the second access network device may also send a downlink data transmission end indication message to the first access network device, where the downlink data transmission end indication message is used to indicate that the core network device completes the downlink data transmission. The downlink data transmission end indication message may be represented by using an end marker (end marker) packet in the address of the tunnel used to transmit downlink data. A downlink data tunnel may be a PDU session tunnel, a DRB tunnel, a logical channel tunnel, or the like. The indication message may alternatively be the interface signaling, to indicate that the PDU session downlink transmission ends or the data bearer downlink transmission ends. The downlink data transmission end indication message may be sent by the core network device to the second access network device.

A process in which the second access network device determines whether the core network device completes the downlink data transmission may be notified by the core network device to the second access network device by using the end marker packet, or may be notified to the second access network device by using interface signaling.

In this embodiment of this application, after determining that data transmission is completed, the first access network device may send an RRC connected release message to the terminal. The RRC connected release message may include a suspend indication and the downlink data.

In this embodiment of this application, before the terminal sends a radio resource control resume request message to the first access network device, the terminal may further initiate a random access procedure to the first access network device. The terminal may first send a random access request message (random access preamble) to the first access network device, and receive a random access response (random access response) message sent by the first access network device.

It may be understood that, in the foregoing embodiments, the method and/or step implemented by the terminal may alternatively be implemented by a component (for example, a chip or a circuit) applicable to the terminal. The method and/or step implemented by the access network device (for example, the first access network device and the second access network device) may alternatively be implemented by a component applicable to the access network device. The method and/or step implemented by the core network device or a core network node may alternatively be implemented by a component applicable to the core network device or the core network node.

It may be understood that in the embodiments of this application, the terminal and/or the access network device may perform some or all steps in the embodiments of this application. These steps or operations are merely examples. In the embodiments of this application, other operations or variations of various operations may be further performed. In addition, the steps may be performed in a sequence different from a sequence presented in the embodiments of this application, and not all the operations in the embodiments of this application may be performed.

The foregoing mainly describes the solutions provided in the embodiments of this application from a perspective of interaction between network elements. Correspondingly, an embodiment of this application further provides a data transmission apparatus. The data transmission apparatus is configured to implement the foregoing methods. The data transmission apparatus may be the terminal in the foregoing method embodiments, or an apparatus including the terminal, or a component applicable to the terminal. Alternatively, the data transmission apparatus may be the access network device (for example, the first access network device or the second access network device) in the foregoing method embodiments, or an apparatus including the access network device, or a component applicable to the access network device. Alternatively, the data transmission apparatus may further be the core network node in the foregoing method embodiments, an apparatus including the core network node, or a component applicable to the core network node. It can be understood that, to implement the foregoing functions, the data transmission apparatus includes a corresponding hardware structure and/or software module for performing the functions. A person skilled in the art should be easily aware that, in combination with the examples described in the embodiments disclosed in this specification, units and algorithm steps can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the data transmission apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, division into modules is an example, and is merely logical function division. In actual implementation, another division manner may be used.

Figure 11:
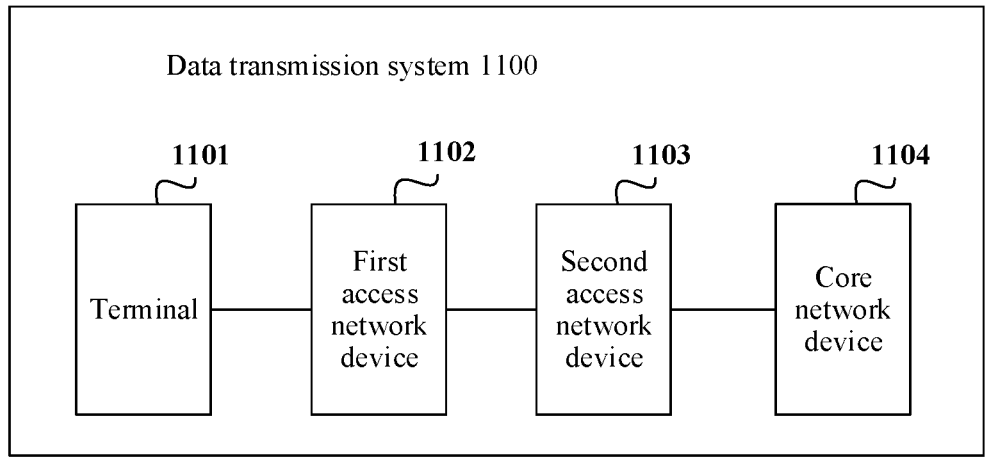
FIG. 11 is a schematic diagram of a data transmission system according to an embodiment of this application.

Based on a same technical concept as that of the foregoing data transmission method, as shown in FIG. 11, an embodiment of this application further provides a data transmission system 1100. The data transmission system 1100 includes a terminal 1101, a first access network device 1102, a second access network device 1103, and a core network device 1104 that are configured to perform the data transmission methods in FIG. 1 to FIG. 10. The first access network device 1102 is an access network device that currently serves the terminal 1101, and the second access network device 1103 is an access network device that configures the terminal 1101 to enter an inactive state.

The first access network device 1102 is configured to send a retrieve terminal context request message to the second access network device 1103, where the retrieve terminal context request message includes indication information used to indicate a requirement of transmitting small data.

The second access network device 1103 is configured to send, to the first access network device 1102, a context of the terminal and a tunnel address used to transmit uplink data.

The first access network device 1102 is further configured to: receive the context of the terminal and the address of the tunnel used to transmit uplink data that are sent by the second access network device 1103; indicate, based on the context of the terminal, the terminal to enter a connected state; receive uplink data sent by the terminal; and send the uplink data to the second access network device 1103 based on the address of the tunnel.

The second access network device 1103 is further configured to send the uplink data to the core network device 1104.

In a possible implementation, the indication information used to indicate the requirement of transmitting the small data includes one or more of the following: information used to indicate transmission of the small data, information used to indicate that an anchor access network device remains unchanged, or information used to indicate that the context of the terminal is not transferred.

In a possible implementation, the terminal 1101 is configured to send a radio resource control resume request message to the first access network device 1102, and the request message includes the indication information used to indicate the requirement of transmitting the small data.

In a possible implementation, when the second access network device 1103 is configured to send, to the first access network device 1102, the context of the terminal and the address of the tunnel used to transmit uplink data, the second access network device 1103 is specifically configured to:

send a retrieve terminal context response message to the first access network device 1102, where the retrieve terminal context response message includes the context of the terminal and the address of the tunnel used to transmit uplink data.

In a possible implementation, the address of the tunnel used to transmit uplink data includes: a protocol data unit PDU session identifier and/or uplink forwarding information.

The uplink forwarding information includes:

an uplink data forwarding address corresponding to a PDU session, at least one data radio bearer list and an uplink data forwarding address corresponding to each data radio bearer list, or at least one LCID list and an uplink data forwarding address corresponding to each LCID list.

In a possible implementation, the first access network device 1102 is further configured to send an uplink data transmission end indication message to the second access network device 1103, where the uplink data transmission end indication message is used to indicate that the terminal completes uplink data transmission.

Figure 12:
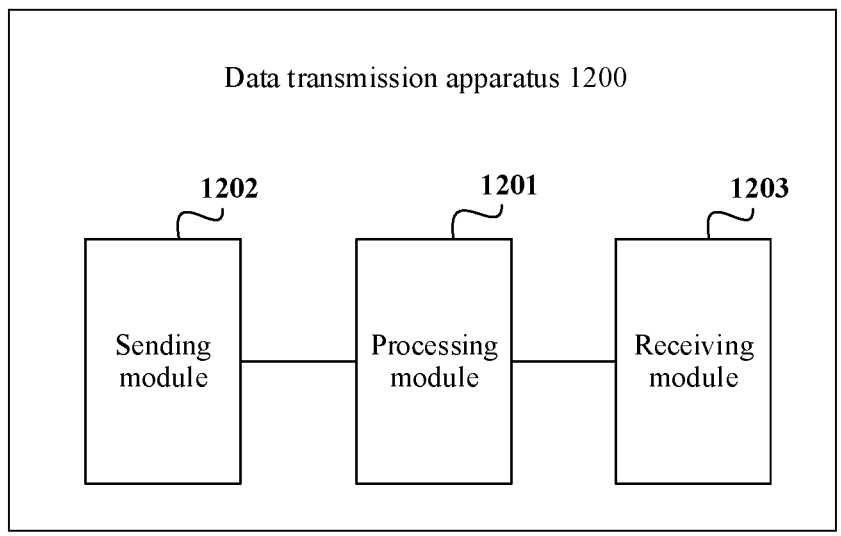
FIG. 12 is a schematic diagram of a data transmission apparatus according to an embodiment of this application.

Based on a same concept as that of the foregoing data transmission method, as shown in FIG. 12, an embodiment of this application further provides a data transmission apparatus 1200.

In a possible manner, the data transmission apparatus 1200 may correspondingly implement an operation of a corresponding terminal in the foregoing method embodiments. The data transmission apparatus 1200 may be a terminal, or may be a component (a chip or a circuit) applicable to a terminal.

In a possible manner, the data transmission apparatus 1200 may include: a processing module 1201, a sending module 1202, and a receiving module 1203. The sending module 1202 is configured to send data, and the receiving module 1203 is configured to receive the data. When the data transmission apparatus performs the step performed by a first access network device, for example, the sending module 1202 is configured to send a retrieve terminal context request message to a second access network device, where the retrieve terminal context request message includes indication information used to indicate a requirement for transmitting small data. The apparatus is an access network device that currently serves the terminal, and the second access network device is an access network device that configures the terminal to enter an inactive state. The receiving module 1203 is configured to receive a context of the terminal and a tunnel address used to transmit uplink data that are sent by the second access network device. The processing module 1201 is configured to indicate, based on the context of the terminal, the terminal to enter a connected state. The receiving module 1203 is further configured to receive uplink data sent by the terminal. The processing module 1201 is further configured to send the uplink data to the second access network device based on the address of the tunnel, and the second access network device sends the uplink data to a core network device.

In a possible implementation, the indication information used to indicate the requirement of transmitting the small data includes one or more of the following: information used to indicate transmission of the small data, information used to indicate that an anchor access network device remains unchanged, or information used to indicate that the context of the terminal is not transferred.

In a possible implementation, the receiving module 1203 is further configured to receive a radio resource control resume request message sent by the terminal, and the request message includes the indication information used to indicate the requirement of transmitting the small data.

In a possible implementation, when the receiving module 1203 is configured to receive the context of the terminal and the address of the tunnel used to transmit uplink data that are sent by the second access network device, the receiving module 1203 is specifically configured to: receive a retrieve terminal context response message sent by the second access network device, where the retrieve terminal context response message includes the context of the terminal and the address of the tunnel used to transmit uplink data.

In a possible implementation, the address of the tunnel used to transmit uplink data includes: a protocol data unit PDU session identifier and/or uplink forwarding information. The uplink forwarding information includes: an uplink data forwarding address corresponding to a PDU session, at least one data radio bearer list and an uplink data forwarding address corresponding to each data radio bearer list, or at least one LCID list and an uplink data forwarding address corresponding to each LCID list.

In a possible implementation, the sending module 1202 is further configured to send an uplink data transmission end indication message to the second access network device, where the uplink data transmission end indication message is used to indicate that the terminal completes uplink data transmission.

Figure 13:
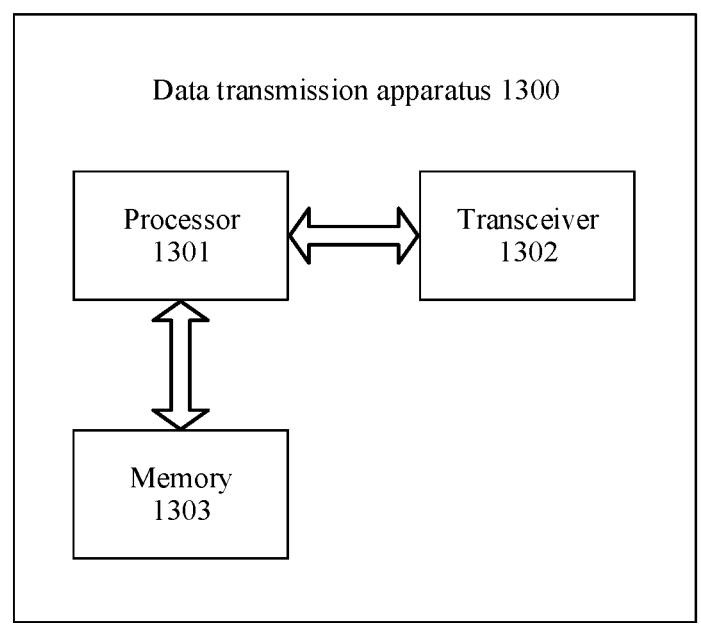
FIG. 13 is a schematic diagram of a data transmission apparatus according to an embodiment of this application.

For example, as shown in FIG. 13, a data transmission apparatus 1300 may include one or more processors 1301, and the processor 1301 may alternatively be referred to as a processing unit or a processing module, and may implement a specific control function. The processor 1301 may be a general-purpose processor, a dedicated processor, or the like. For example, the processor 1301 may be a baseband processor or a central processing unit. The baseband processor may be configured to process a communication protocol and communication data. The central processing unit may be configured to: control a data transmission apparatus (for example, a base station, a baseband chip, a DU, or a CU), execute a software program, and process data in the software program.

In an optional design, the processor 1301 may also store instructions, and the instructions may be run by the processor, so that the data transmission apparatus 1300 performs the method corresponding to the terminal or the access network device (the first access network device or the second access network device) described in the foregoing method embodiments.

In another possible design, the data transmission apparatus 1300 may include a circuit. The circuit may implement the sending, receiving, or communication function in the foregoing method embodiments.

Optionally, the data transmission apparatus may include one or more memories 1303. The memory 1303 stores instructions, data, or other information. The instructions may be run on the processor, so that the data transmission apparatus 1300 performs the method described in the foregoing method embodiments. Optionally, the memory may further store other related data. Optionally, the processor may also store instructions and/or data. The processor and the memory may be separately disposed, or may be integrated together.

Optionally, the data transmission apparatus may further include a transceiver 1302.

The processor 1301 may be referred to as a processing unit. The transceiver 1302 may be referred to as a transceiver unit, a transceiver machine, a transceiver circuit, an interface circuit, a transceiver, or the like, and is configured to implement a transceiver function of the data transmission apparatus.

In a design, a data transmission apparatus (for example, an integrated circuit, a wireless device, a circuit module, a network device, or a terminal) may include a processor and a transceiver. If the data transmission apparatus is configured to implement an operation corresponding to the terminal in the embodiments shown in FIG. 2 to FIG. 10, for example, the transceiver may send a radio resource control resume request message to a first access network device. For a specific processing manner, refer to related descriptions in the foregoing embodiments. If the data transmission apparatus is configured to implement an operation corresponding to the first access network device in the embodiments shown in FIG. 2 to FIG. 10, for example, the transceiver may receive a radio resource control resume request message sent by a terminal, send a retrieve terminal context request message to a second access network device, and receive a retrieve terminal context response message sent by the second access network device. If the data transmission apparatus is configured to implement an operation corresponding to the second access network device in the embodiments shown in FIG. 2 to FIG. 10, for example, the transceiver may receive a retrieve terminal context request message sent by a first access network device, and send a retrieve terminal context response message to the second access network device.

The processing module 1201 in FIG. 12 may be implemented through the processor 1301, and the sending module 1202 and the receiving module 1203 may be implemented through a communication interface.

The processor and the transceiver described in this application may be implemented on an integrated circuit (integrated circuit, IC), an analog IC, a radio frequency integrated circuit RFIC, a hybrid signal IC, an application-specific integrated circuit (application-specific integrated circuit, ASIC), a printed circuit board (printed circuit board, PCB), an electronic device, or the like. The processor and the transceiver may also be manufactured by using various IC technologies, for example, a complementary metal-oxide-semiconductor (complementary metal-oxide-semiconductor, CMOS), an N-type metal-oxide-semiconductor (N-metal-oxide-semiconductor, NMOS), a P-type metal-oxide-semiconductor (positive channel metal-oxide-semiconductor, PMOS), a bipolar junction transistor (Bipolar Junction Transistor, BJT), a bipolar CMOS (BiCMOS), silicon germanium (SiGe), and gallium arsenide (GaAs).

Although the data transmission apparatus is described in the foregoing embodiments by using an access network device or a terminal as an example, the scope of the data transmission apparatus described in this application is not limited thereto. The data transmission apparatus may be an independent device or may be a part of a relatively large device. For example, the device may be:

(1) an independent integrated circuit IC, a chip, or a chip system or subsystem;
(2) a set having one or more ICs, where optionally, the IC set may further include a storage component configured to store data and/or instructions;
(3) an ASIC, for example, a modem (MSM);
(4) a module that can be embedded in another device;
(5) a receiver, a terminal, a cellular phone, a wireless device, a handheld device, a mobile unit, a network device, or the like; or
(6) another device, or the like.

The processor may be a central processing unit (central processing unit, CPU), a network processor (network processor, NP), or a combination of a CPU and an NP.

The processor may further include a hardware chip or another general-purpose processor. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field programmable logic gate array (field programmable gate array, FPGA), a generic array logic (generic array logic, GAL) and another programmable logic device, a discrete gate or a transistor logic device, a discrete hardware component, or the like, or any combination thereof. The general-purpose processor may be a microprocessor, or the processor may be any conventional processor or the like.

It may be understood that the memory mentioned in the embodiments of this application may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory described in this application is intended to include but is not limited to these memories and any memory of another proper type.

An embodiment of this application provides a computer storage medium. The computer storage medium stores a computer program, and the computer program is used to implement the data transmission method.

An embodiment of this application provides a computer program product including instructions. When the computer program product runs on a computer, the computer is enabled to perform the data transmission method provided above.

Any data transmission apparatus provided in the embodiments of this application may alternatively be a chip.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided to a general-purpose computer, a dedicated computer, an embedded processor, or a processor of another programmable data processing device to generate a machine, so that the instructions executed by a computer or the processor of the another programmable data processing device generate an apparatus for implementing a specified function in one or more processes in the flowcharts and/or in one or more blocks in the block diagrams.

These computer program instructions may alternatively be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although some embodiments of this application have been described, a person skilled in the art can make changes and modifications to these embodiments once the person learns the basic inventive concept. Therefore, the following claims are intended to be construed as to cover the preferred embodiments and all changes and modifications falling within the scope of this application.

Apparently, a person skilled in the art can make various modifications and variations to the embodiments of this application without departing from the spirit and scope of the embodiments of this application. This application is intended to cover these modifications and variations of the embodiments of this application provided that they fall within the scope of the following claims and their equivalent technologies.

What is claimed is:

1. A data transmission system, comprising:
a first access network device; and
a second access network device, wherein the first access network device currently serves a terminal in a radio resource control (RRC) inactive state, and the second access network device is an access network device that previously served the terminal and configured the terminal to enter the RRC inactive state, and
wherein the first access network device comprises at least one first processor, and one or more first memories coupled to the at least one first processor and storing first programming instructions that, when executed by the at least one first processor, cause the first access network device to:
send a retrieve terminal context request message to the second access network device, wherein the retrieve terminal context request message comprises indication information indicating a requirement of transmitting small data, and the small data is uplink data;
wherein the second access network device comprises at least one second processor, and one or more second memories coupled to the at least one second processor and storing second programming instructions that, when executed by the at least one second processor, cause the second access network device to:
send, to the first access network device, a context of the terminal and an address of a tunnel used to transmit the uplink data, wherein the tunnel is established between the second access network device and the first access network device;
wherein the first programming instructions, when executed by the at least one first processor, further cause the first access network device to:
receive, from the second access network device, the context of the terminal and the address of the tunnel used to transmit the uplink data;
receive the uplink data sent by the terminal; and
send the uplink data to the second access network device based on the address of the tunnel; and
wherein the second programming instructions, when executed by the at least one second processor, further cause the second access network device to:
receive the uplink data from the first access network device; and
send the uplink data to a core network device.

2. The data transmission system according to claim 1, wherein the indication information comprises one or more of the following: information indicating transmission of the small data, information indicating that an anchor access network device remains unchanged, or information indicating that the context of the terminal is not transferred.

3. The data transmission system according to claim 1, wherein the first programming instructions, when executed by the at least one first processor, cause the first access network device to:
receive an RRC resume request message from the terminal, wherein the RRC resume request message comprises the indication information indicating the requirement of transmitting the small data.

4. The data transmission system according to claim 1, wherein the context of the terminal and the address of the tunnel used to transmit the uplink data are comprised in a retrieve terminal context response message sent from the second access network device to the first access network device.

5. The data transmission system according to claim 1, wherein the address of the tunnel used to transmit the uplink data comprises a protocol data unit (PDU) session identifier or uplink forwarding information, and wherein the uplink forwarding information comprises:
an uplink data forwarding address corresponding to a PDU session,
at least one data radio bearer list and an uplink data forwarding address corresponding to each data radio bearer list, or
at least one logical channel identifier (LCID) list and an uplink data forwarding address corresponding to each LCID list.

6. The data transmission system according to claim 1, wherein the first programming instructions, when executed by the at least one first processor, cause the first access network device to:
send an uplink data transmission end indication message to the second access network device, wherein the uplink data transmission end indication message indicates that that the terminal completes uplink data transmission.

7. A first access network device, comprising at least one processor, and one or more memories coupled to the at least one processor and storing programming instructions that when executed by the at least one processor, cause the first access network device to:
send a retrieve terminal context request message to a second access network device, wherein the retrieve terminal context request message comprises indication information indicating a requirement of transmitting small data, the first access network device currently serves a terminal in a radio resource control (RRC) inactive state, the second access network device is an access network device that previously served the terminal and configured the terminal to enter the RRC inactive state, and the small data is uplink data;
receive, from the second access network device, a context of the terminal and an address of a tunnel used to transmit the uplink data, wherein the tunnel is established between the second access network device and the first access network device;
receive the uplink data from the terminal; and
send the uplink data to the second access network device based on the address of the tunnel.

8. The first access network device according to claim 7, wherein the indication information comprises one or more of the following: information indicating transmission of the small data, information indicating that an anchor access network device remains unchanged, or information indicating that the context of the terminal is not transferred.

9. The first access network device according to claim 7, wherein the programming instructions, when executed by the at least one processor, cause the first access network device to:
receive an RRC resume request message from the terminal, wherein the RRC request message comprises the indication information indicating the requirement of transmitting the small data.

10. The first access network device according to claim 7, wherein receiving the context of the terminal and the address of the tunnel used to transmit the uplink data comprises:
receiving a retrieve terminal context response message from the second access network device, wherein the retrieve terminal context response message comprises the context of the terminal and the address of the tunnel used to transmit the uplink data.

11. The first access network device according to claim 7, wherein the address of the tunnel used to transmit the uplink data comprises a protocol data unit (PDU) session identifier or uplink forwarding information, and wherein the uplink forwarding information comprises:
- an uplink data forwarding address corresponding to a PDU session,
- at least one data radio bearer list and an uplink data forwarding address corresponding to each data radio bearer list, or
- at least one logical channel identifier (LCID) list and an uplink data forwarding address corresponding to each LCID list.

12. The first access network device according to claim 7, wherein the programming instructions, when executed by the at least one processor, cause the first access network device to:

send an uplink data transmission end indication message to the second access network device, wherein the uplink data transmission end indication message indicates that the terminal completes uplink data transmission.

13. The data transmission system according to claim 1, wherein the context of the terminal and the address of the tunnel used to transmit the uplink data are sent to the first access network device in a same message.

14. The data transmission system according to claim 1, wherein the context of the terminal and the address of the tunnel used to transmit the uplink data are sent to the first access network device in different messages.

15. The data transmission system according to claim 1, wherein the address of the tunnel used to transmit the uplink data comprises a protocol data unit (PDU) session identifier.

* * * * *